(12) United States Patent
Deo et al.

(10) Patent No.: US 12,330,689 B2
(45) Date of Patent: Jun. 17, 2025

(54) PREDICTING AGENT TRAJECTORIES

(71) Applicant: Motional AD LLC, Boston, MA (US)

(72) Inventors: Nachiket Deo, San Diego, CA (US); Oscar Olof Beijbom, Santa Monica, CA (US); Eric Wolff, Boston, MA (US)

(73) Assignee: Motional AD LLC, Boston, MA (US)

( * ) Notice: Subject to any disclaimer, the term of this patent is extended or adjusted under 35 U.S.C. 154(b) by 512 days.

(21) Appl. No.: 17/727,617

(22) Filed: Apr. 22, 2022

(65) Prior Publication Data

US 2022/0355825 A1 Nov. 10, 2022

Related U.S. Application Data

(60) Provisional application No. 63/179,169, filed on Apr. 23, 2021.

(51) Int. Cl.
  *B60W 60/00* (2020.01)
  *B60W 50/00* (2006.01)
  *G06N 3/08* (2023.01)

(52) U.S. Cl.
  CPC .... *B60W 60/0027* (2020.02); *B60W 50/0097* (2013.01); *G06N 3/08* (2013.01); *B60W 2050/0022* (2013.01); *B60W 2556/40* (2020.02)

(58) Field of Classification Search
  CPC ......... B60W 60/0027; B60W 50/0097; B60W 2050/0022; B60W 2556/40; G06N 3/08; G06N 3/0464; G06N 3/084; G06N 3/092; G06N 3/045; G06N 3/0442
  See application file for complete search history.

(56) References Cited

U.S. PATENT DOCUMENTS

| | | | |
|---|---|---|---|
| 2019/0163191 A1 | 5/2019 | Sorin et al. | |
| 2020/0065374 A1* | 2/2020 | Gao | G06N 3/08 |
| 2020/0172098 A1* | 6/2020 | Abrahams | G06N 3/047 |
| 2020/0302250 A1* | 9/2020 | Chu | G06N 3/084 |
| 2020/0379461 A1* | 12/2020 | Singh | G05D 1/0088 |
| 2021/0232913 A1* | 7/2021 | Martin | G06N 3/088 |
| 2022/0157294 A1* | 5/2022 | Li | G06N 3/08 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — James J Lee
*Assistant Examiner* — Alexander George Matta
(74) *Attorney, Agent, or Firm* — Fish & Richardson P.C.

(57) ABSTRACT

Provided are methods for predicting agent trajectories, which can include generating a graph corresponding to a map of a scene by encoding map features and agent features as node encodings of the graph and determining a policy for application to outgoing edges of the nodes of the graph. Some methods described also include sampling paths for a target vehicle in the scene according to the policy and predicting a set of trajectories based on the sampled paths traversed by the policy and a sampled latent variable. Systems and computer program products are also provided.

19 Claims, 17 Drawing Sheets

(56) References Cited

OTHER PUBLICATIONS

Caesar et al., "nuScenes: A multimodal dataset for autonomous driving," CoRR, submitted on Mar. 26, arXiv:1903.11027, 2019, 16 pages.
Chai et al., "MultiPath: Multiple probabilistic anchor trajectory hypotheses for behavior prediction," CoRR, submitted Oct. 12, 2019, arXiv:1910.05449, 14 pages.
Cui et al., "Multimodal trajectory predictions for autonomous driving using deep convolutional networks," CoRR, revised Mar. 1, 2019, arXiv:1809.10732v2, 7 pages.
Deo et al., "Multimodal Trajectory Prediction Conditioned on Lane-Graph Traversals," arXiv preprint, arXiv:2106.15004v2, Sep. 15, 2021, 12 pages.
Deo et al., "Trajectory forecasts in unknown environments conditioned on grid-based plans," CoRR, submitted Jan. 3, 2020, arXiv:2001.00735, 12 pages.
Gao et al., "Vectornet: Encoding HD maps and agent dynamics from vectorized representation," In Proceedings of the IEEE/CVF Conference on Computer Vision and Pattern Recognition (CVPR), 2018, pp. 11525-11533.
Gupta et al., "Social GAN: Socially acceptable trajectories with generative adversarial networks," In Proceedings of the IEEE/CVF Conference on Computer Vision and Pattern Recognition (CVPR), 2018, pp. 2255-2264.
International Search Report and Written Opinion in International Appln. No. PCT/US2022/026045, dated Aug. 18, 2022, 10 pages.
Ivanovic et al., "The Trajectron: Probabilistic Multi-Agent Trajectory Modeling With Dynamic Spatiotemporal Graphs," Proceedings of the IEEE/CVF International Conference on Computer Vision (ICCV), 2019, pp. 2375-2384.
Khandelwal et al., "What-if motion prediction for autonomous driving," CoRR, submitted on Aug. 24, 2020, arXiv:2008.10587, 16 pages.
Kipf et al., "Semi-supervised classification with graph convolutional networks," CoRR, revised on Feb. 22, 2017, arXiv:1609.02907, 14 pages.
Kitani et al., "Activity Forecasting," Computer Vision—ECCV 2012: 12th European Conference on Computer Vision, Florence, Italy, Oct. 7-13, 2012; Proceedings, 2012, Part IV(12):201-214.
Lee et al., "DESIRE: Distant future prediction in dynamic scenes with interacting agents," IEEE/CVF Conference on Computer Vision and Pattern Recognition (CVPR), 2017, pp. 336-345.
Liang et al., "Learning Lane Graph Representations for Motion Forecasting," CoRR, Submitted Jul. 27, 2020, arXiv:2007.13732, 18 pages.
Luo et al., "Probabilistic multi-modal trajectory prediction with lane attention for autonomous vehicles," CoRR, submitted Jul. 6, 2020, arXiv:2007.02574, 7 pages.
Makansi et al., "Overcoming limitations of mixture density networks: A sampling and fitting framework for multimodal future prediction," IEEE/CVF Conference on Computer Vision and Pattern Recognition (CVPR), 2019, pp. 7144-7153.
Mangalam et al., "It is not the journey but the destination: Endpoint conditioned trajectory prediction," CoRR, revised Jul. 18, 2020, arXiv:2004.02025, 19 pages.
Messaoud et al., "Trajectory prediction for autonomous driving based on multi-head attention with joint agent-map representation," CoRR, revised on Sep. 2, 2020, arXiv:2005.02545, 8 pages.
nuscenes.org [online], "nuScenes by Aptiv," available on or before Apr. 16, 2020, via Internet Archive: Wayback Machine URL <http://web.archive.org/web/20200416022447/https://www.nuscenes.org/>, retrieved on Mar. 21, 2023, URL <https://www.nuscenes.org/>, 3 pages.
Paden et al., "A survey of motion planning and control techniques for self-driving urban vehicles," CoRR, submitted Apr. 25, 2016, arXiv:1604.07446, 27 pages.
Phan-Minh et al., "Covernet: Multimodal behavior prediction using trajectory sets," Proceedings of the IEEE/CVF Conference on Computer Vision and Pattern Recognition, 2020, pp. 14074-14083.
Planning Algorithms, LaValle (ed.), 2006, 1023 pages.
Rhinehart et al., "PRECOG: PREdiction Conditioned on Goals in Visual Multi-Agent Settings," Proceedings of the IEEE/CVF International Conference on Computer Vision, 2019, pp. 2821-2830.
Rhinehart et al., "R2P2: A ReparameteRized Pushforward Policy for Diverse, Precise Generative Path Forecasting," Proceedings of the European Conference on Computer Vision (ECCV), 2018, pp. 772-788.
Sadeghian et al., "SoPhie: An Attentive GAN for Predicting Paths Compliant to Social and Physical Constraints," Proceedings of the IEEE/CVF Conference on Computer Vision and Pattern Recognition (CVPR), 2019, pp. 1349-1358.
Salzmann et al., "Trajectron++: Dynamically-feasible trajectory forecasting with heterogeneous data," CoRR, revised Nov. 21, 2020, arXiv:2001.03093, 23 pages.
Vaswani et al., "Attention is all you need," 31st Conference on Neural Information Processing Systems (NIPS 2017), Long Beach, CA, USA, Dec. 4-9, 2017, 11 pages.
Veličković et al., "Graph attention networks," CoRR, revised Feb. 4, 2018, arXiv:1710.10903, 12 pages.
Wang et al., "Stepwise goal-driven networks for trajectory prediction," CoRR, submitted Mar. 25, 2021, arXiv:2103.14107, 11 pages.
Wulfmeier et al., "Maximum Entropy Deep Inverse Reinforcement Learning," CoRR, revised Mar. 11, 2016, arXiv:1507.04888, 10 pages.
Zeng et al., "End-to-end interpretable neural motion planner," Proceedings of IEEE/CVF Conference on Computer Vision and Pattern Recognition (CVPR), 2019, pp. 8660-8669.
Zeng et al., "LaneRCNN: Distributed representations for graph-centric motion forecasting," CoRR, submitted Jan. 17, 2021, arXiv:2101.06653, 14 pages.
Zhang et al., "Map-adaptive goal-based trajectory prediction," 4th Conference on Robot Learning (CoRL 2020), Cambridge MA, USA, Nov. 16-20, 2020; Proceedings of Machine Learning Research, PMLR, 2020, 155:1371-1383.
Zhao et al., "Multi-agent tensor fusion for contextual trajectory prediction," IEEE/CVF Conference on Computer Vision and Pattern Recognition, 2019, 9 pages.
Zhao et al., "TNT: Target-driveN trajectory prediction," 4th Conference on Robot Learning (CoRL 2020), Cambridge MA, USA, Nov. 16-20, 2020; Proceedings of Machine Learning Research, PMLR, 2020, 155:895-904.
Ziebart et al., "Maximum Entropy Inverse Reinforcement Learning," AAAI-08: Twenty-Third Conference on Artificial Intelligence, Chicago, Illinois, Jul. 13-17, 2008, 8:1433-1438.
Ziebart et al., "Modeling Interaction via the Principle of Maximum Causal Entropy," ICML'10: Proceedings of the 27th International Conference on International Conference on Machine Learning, Jun. 2010, pp. 1255-1262.
Ziebart, "Modeling Purposeful Adaptive Behavior with the Principle of Maximum Causal Entropy," Doctoral Thesis for the degree of Doctor of Philosophy, Carnegie Mellon University, School of Computer Science, Dec. 2010, 240 pages.
International Preliminary Report on Patentability in International Appln. No. PCT/US2022/026045, dated Nov. 2, 2023, 8 pages.
Cheng et al., "Exploring Dynamic Context for Multi-path Trajectory Prediction," CoRR, revised on Mar. 24, 2021, or arXiv:2010.16267v3, 7 pages.
Extended European Search Report in European Appln. No. 22792623.5, mailed on Sep. 25, 2024, 10 pages.

* cited by examiner

PREDICTING AGENT TRAJECTORIES

CROSS-REFERENCE TO RELATED APPLICATIONS

This application claims the benefits under 35 USC § 119(e) of U.S. Provisional Patent Application No. 63/179,169, entitled "Predicting Agent Trajectories," filed Apr. 23, 2021. The disclosure of the foregoing application is incorporated herein by reference in its entirety for all purposes.

BACKGROUND

There is inherent uncertainty in predicting the future, which makes trajectory prediction a challenging problem. To safely and efficiently navigate through complex traffic scenes, it is desired for autonomous vehicles to accurately predict the future trajectories of surrounding vehicles, so that autonomous vehicles can plan their own trajectories accordingly.

DETAILED DESCRIPTION

Figure 1:
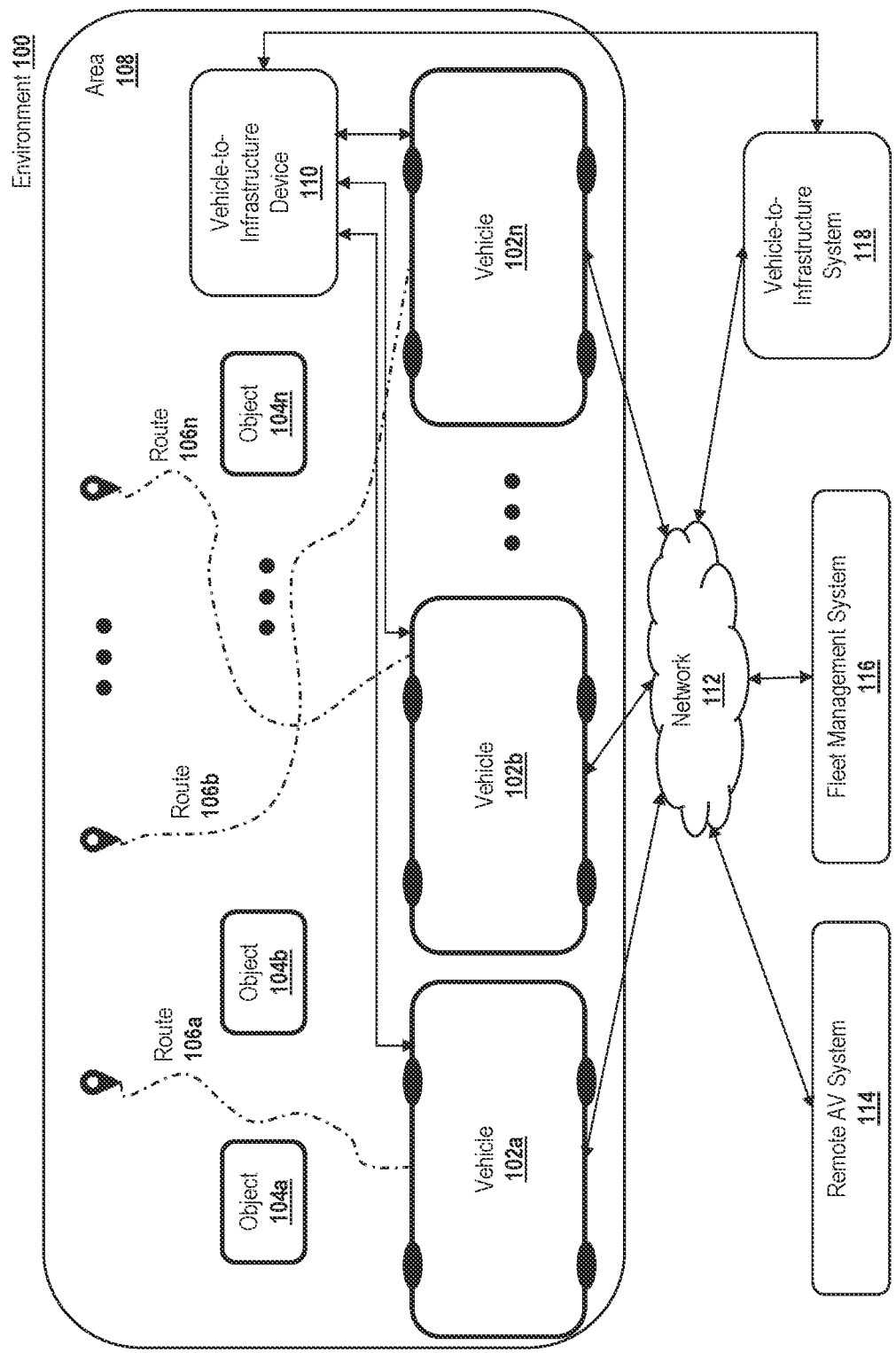
FIG. 1 is an example environment in which a vehicle including one or more components of an autonomous system can be implemented.

In the following description, numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like, are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement using graphical representations of a scene for predicting agent trajectories. A vehicle (such as an autonomous vehicle) navigates through traffic scenes (e.g., within the environment) by predicting future trajectories of surrounding agents (e.g., target vehicles or pedestrians). High-definition maps and agent trajectories are encoded into a graph that represents the scene. Agent trajectories are predicted according to a discrete policy (e.g., a state-to-action mapping), and a context is selectively aggregated (e.g., context is conditioned on lane graph traversals) for each trajectory. A latent variable is sampled to account for the longitudinal variability of the predicted trajectories. A final set of trajectories for each agent in the scene is determined by sampling the paths (routes) traversed by policy and latent distribution (e.g., K-means clustering, output cluster centers).

Some of the advantages of these techniques include selectively conditioning predictions on lane-graph traversals, which leads to trajectories that are (i) diverse in terms of routes, such that the most paths that are likely to occur according to the data are produced, and (ii) precise and scene compliant with the lowest off-road rates. Precise trajectories refer to paths that are likely to occur according to the data. The use of sampled latent variables leads to trajectories that are diverse in terms of motion profiles. Moreover, the present techniques improve sample efficiency through a graph-based representation with distinct trajectories. The context is specifically captured at nodes, which ensures the inclusion of a relevant context for each trajectory. In some cases, traditional techniques fail to capture the relevant context using a convolutional neural network (convent) receptive field. Additionally, the present techniques are necessarily rooted in computer technology that enables the operation of autonomous vehicles. Models of agents in the scene are improved, resulting in a more accurate prediction of agent behaviors. The model is efficient in terms of the state space, as graph locations are drivable locations with few non-drivable areas represented. This results in more efficient use of computing resources, including processing and memory resources.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments, V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2 I device 110, network 112, remote AV system 114, fleet management system 116, and/or V2 I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2 I device 110, remote AV system 114, and/or V2 I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2 I system 118 includes at least one device configured to be in communication with vehicles 102, V2 I device 110, remote AV system 114, and/or fleet management system 116 via network 112. In some examples, V2 I system 118 is configured to be in communication with V2 I device 110 via a connection different from network 112. In some embodiments, V2 I system 118 includes a server, a group of servers, and/or other like devices. In some embodiments, V2 I system 118 is associated with a municipality or a private institution (e.g., a private institution that maintains V2 I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
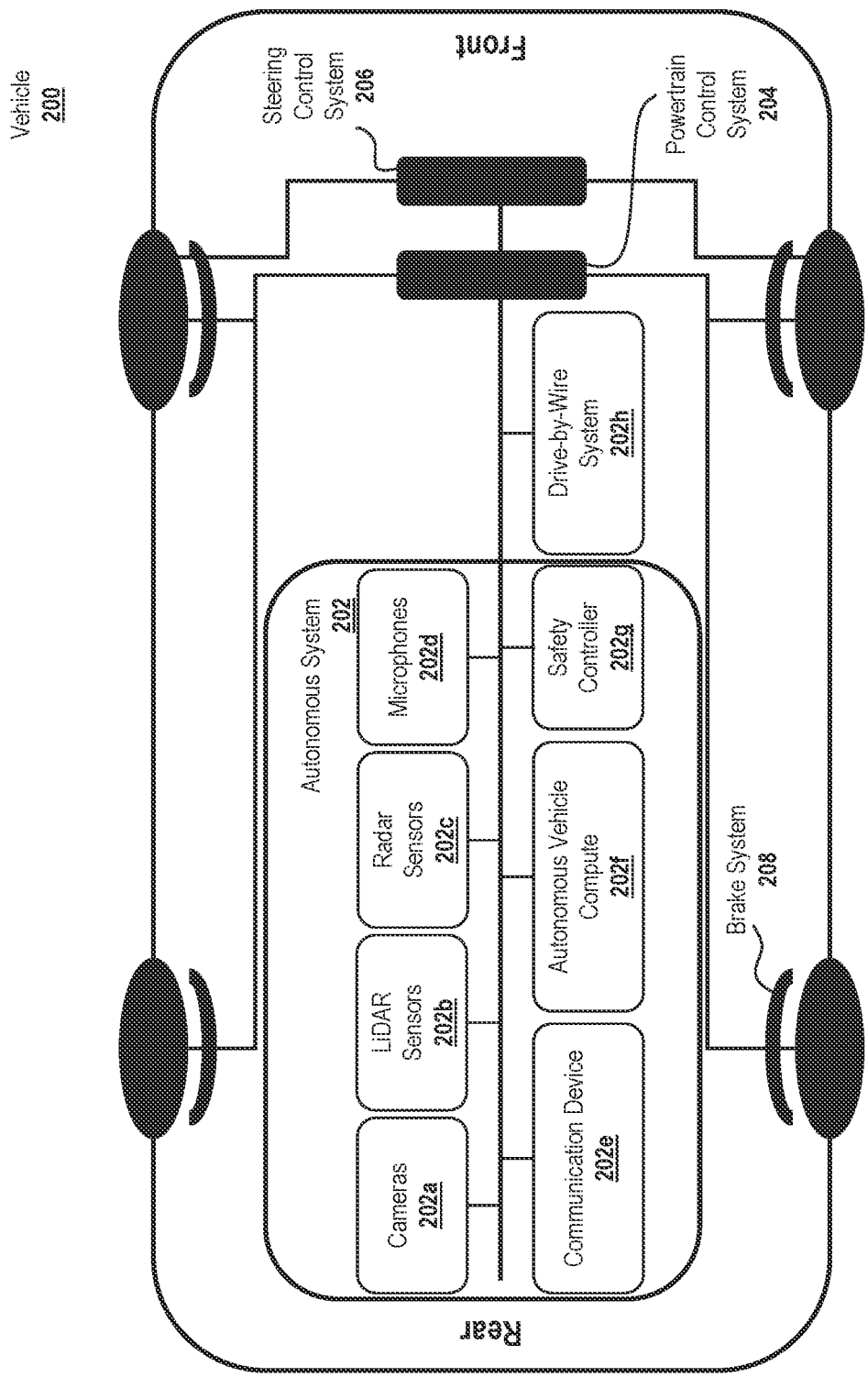
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
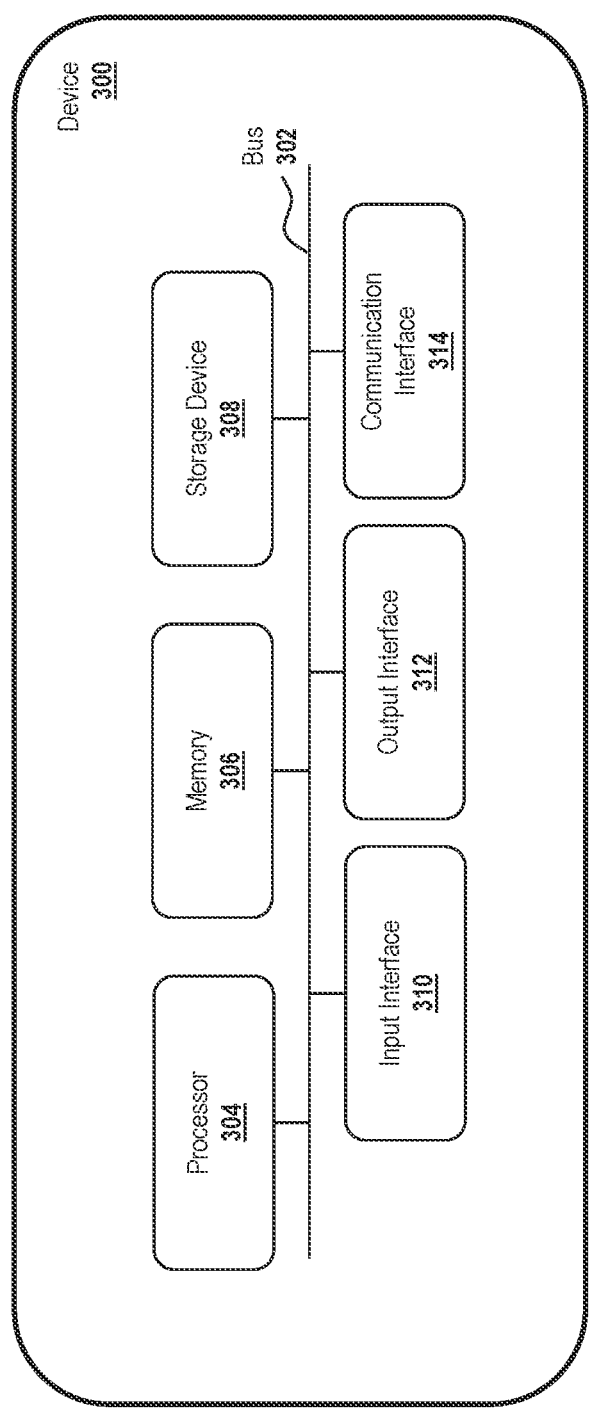
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
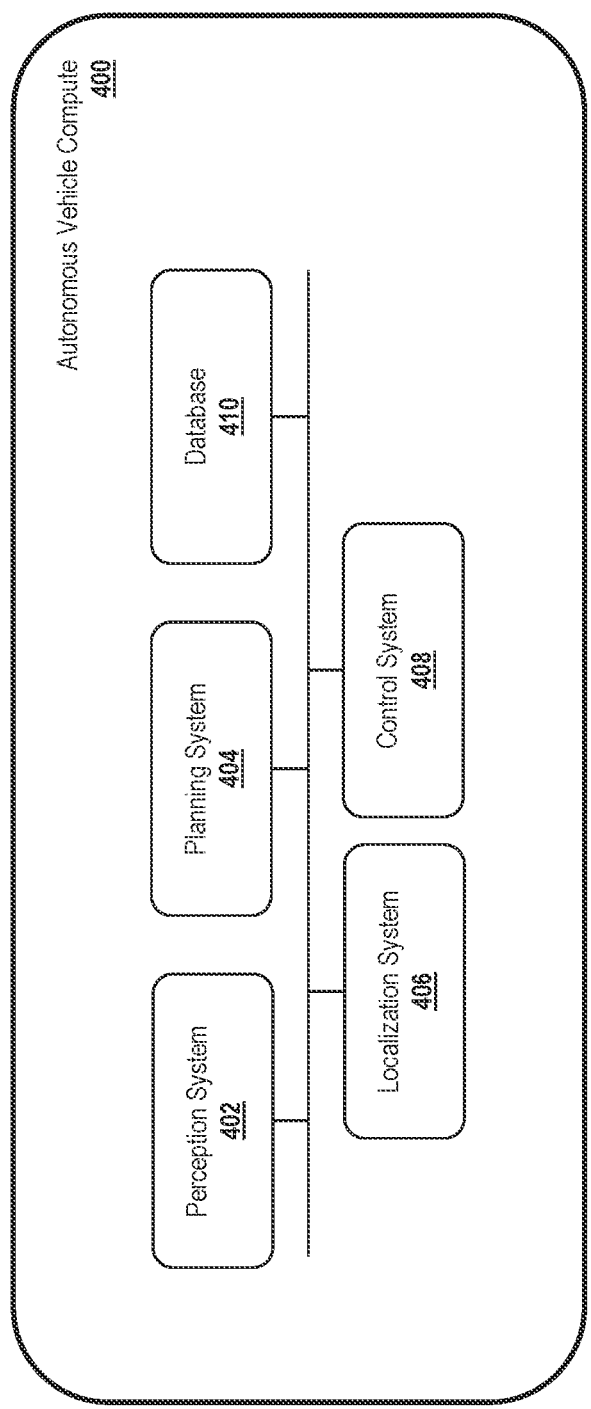
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
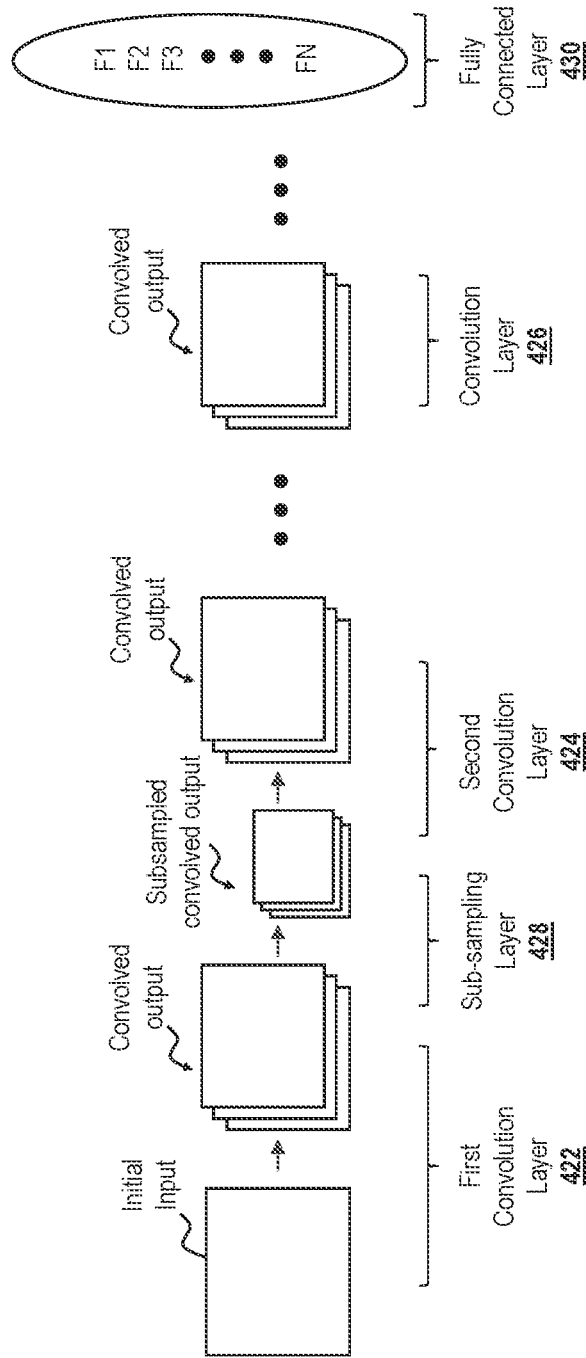
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
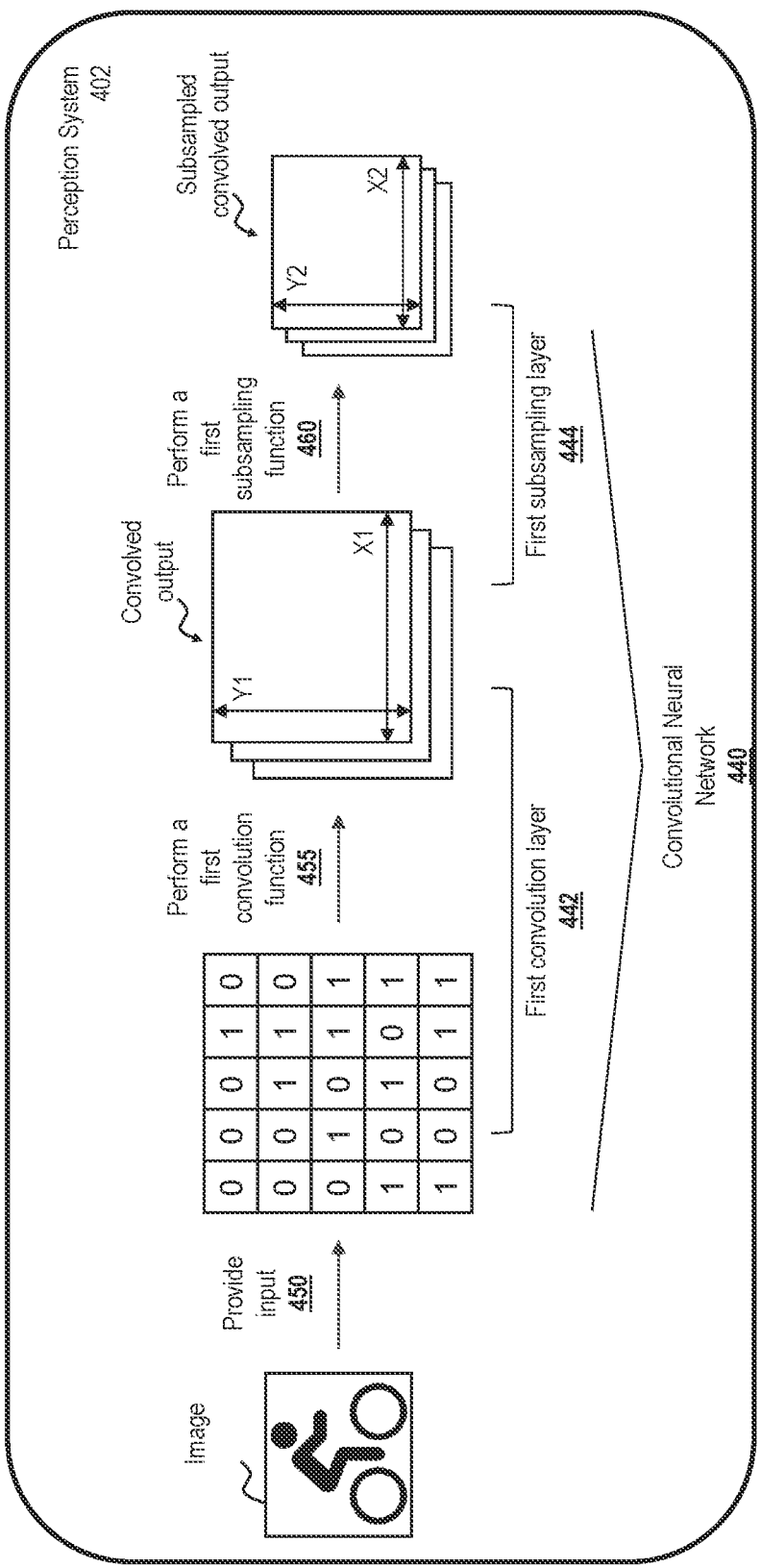
FIGS. 4C and 4D are a diagram illustrating example operation of a CNN.
Figure 4D:
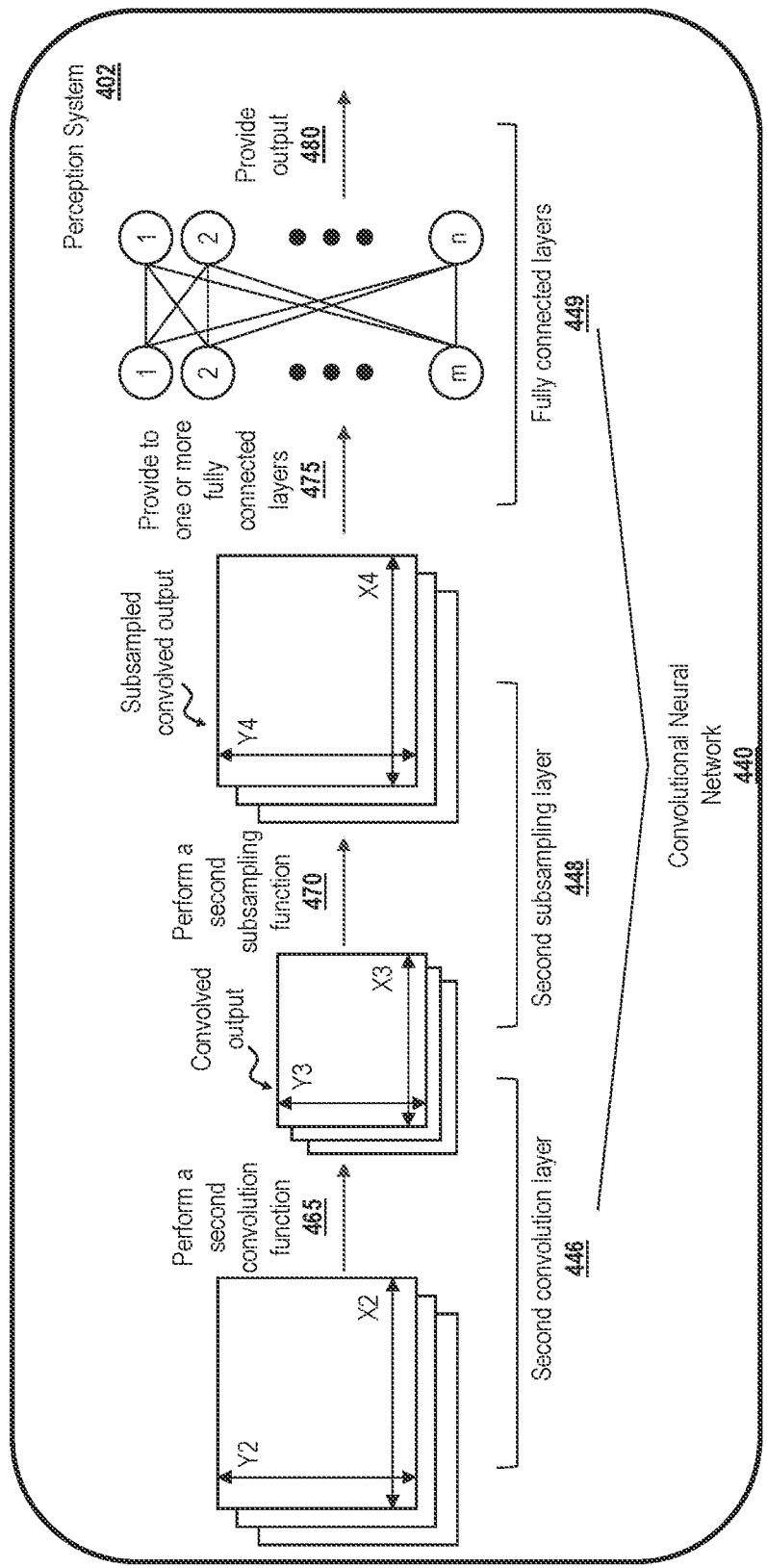

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a sub sampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a sub sampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second sub sampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second sub sampling layer 448.

At step 475, CNN 440 provides the output of each neuron of second subsampling layer 448 to fully connected layers 449. For example, CNN 440 provides the output of each neuron of second sub sampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
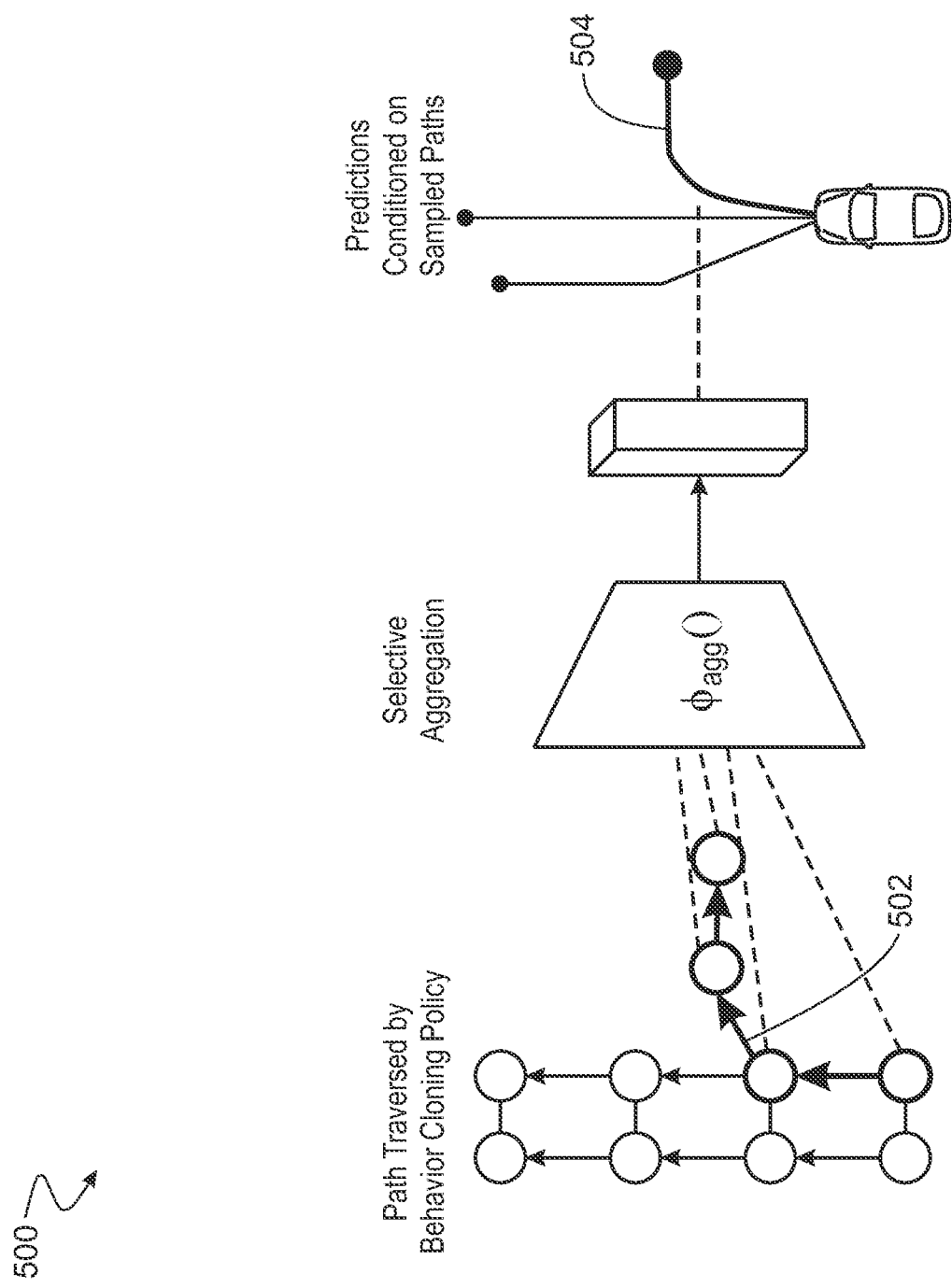
FIG. 5 is a block diagram illustrating an example process of agent trajectory prediction.

FIG. 5 is a block diagram illustrating an example process 500 of agent trajectory prediction. In some embodiments, process 500 is implemented (e.g., completely, partially, etc.) using an autonomous system that is the same as or similar to autonomous system 202, described in reference to FIG. 2. In some embodiments, one or more of the steps of process 500 are performed (e.g., completely, partially, and/or the like) by another device or system, or another group of devices and/or systems that are separate from, or include, the autonomous system. For example, one or more steps of process 500 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of process 500 may be performed between any of the above-noted systems in cooperation with one another.

In some embodiments, high definition (HD) maps and agent tracks (e.g., prior agent trajectories) are encoded using a graph representation of the scene. The graph structure of the scene is leveraged to explicitly model the lateral or route variability in trajectories. However, instead of aggregating an entire scene context into a single vector and learning a one-to-many mapping to multiple trajectories, predictions of trajectories are conditioned on selectively aggregated context based on paths traversed in the directed graph by a discrete policy. For example, context along a sampled path 502 is aggregated, and a trajectory 504 is predicted based on the context of the sampled path 502. In some embodiments, a policy is a state-to-action mapping that mimics actions of an expert (ground truth) in selectively aggregated contexts.

In some embodiments, a portion of the scene context (e.g., the context along the sampled path 502) is selectively aggregated for each prediction, by sampling path traversals (e.g., the sampled path 502) from a learned behavior cloning policy (the policy is learned by behavior cloning).

By directly selecting a subset of the graph (a sampled path) that is used for each prediction, representational demands on the trajectory decoder can be reduced. Additionally, the probabilistic policy leads to a diverse set of sampled paths and captures the lateral variability of the multimodal trajectory distribution.

In some embodiments, the predictions are additionally conditioned on a sampled latent variable to account for longitudinal variability of trajectories. This enables the prediction of distinct trajectories even for identical path traversals.

Figure 6:
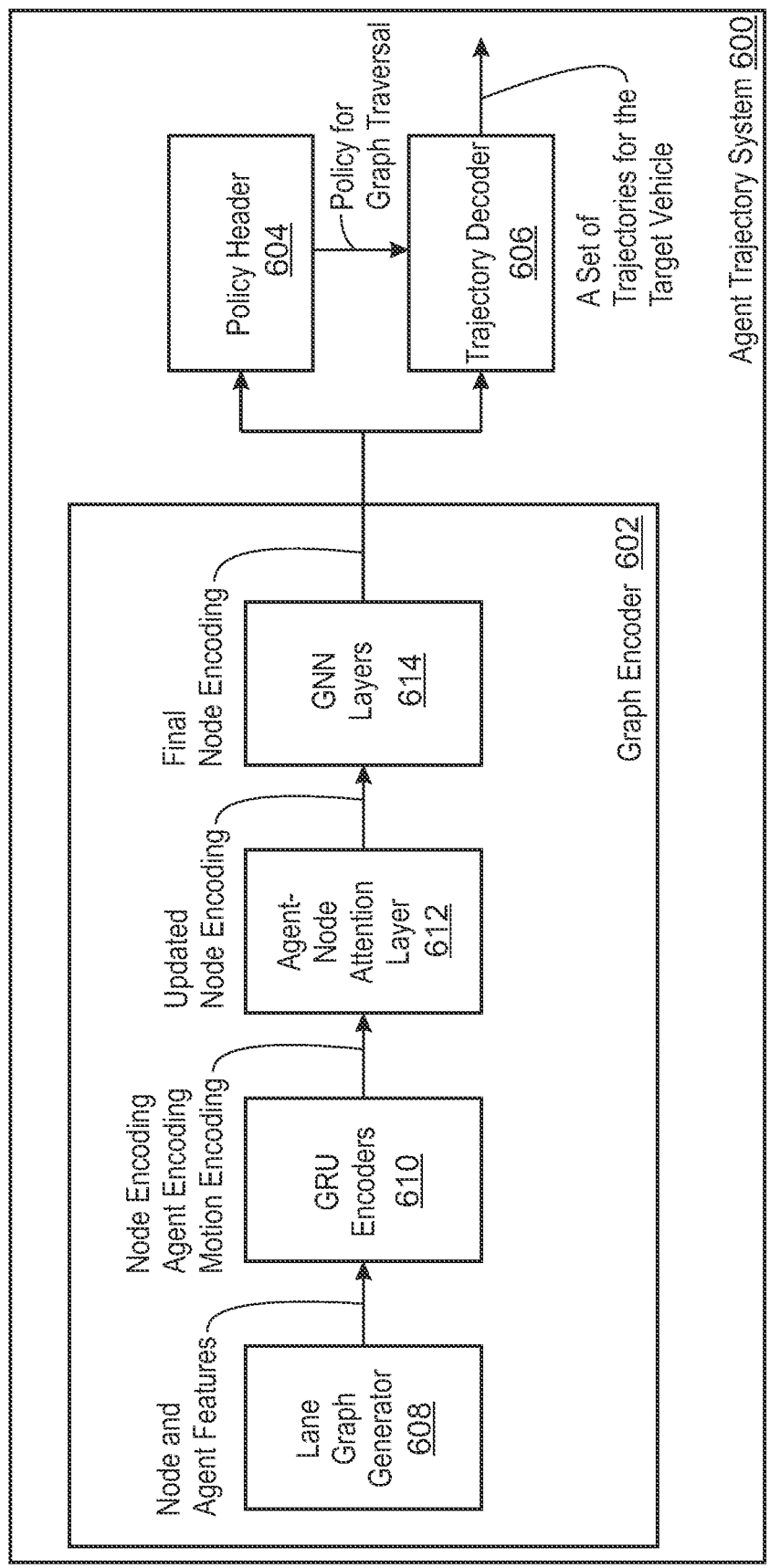
FIG. 6 is a block diagram illustrating an example agent trajectory prediction system.

FIG. 6 is a block diagram illustrating an example agent trajectory prediction system 600. In some embodiments, the agent trajectory prediction system 600 is included in the autonomous system 202 of FIG. 2, device 300 of FIG. 3, or the autonomous vehicle compute 400 of FIG. 4A. The example agent trajectory prediction system 600 includes graph encoder 602, policy header 604, and trajectory decoder 606. The graph encoder 602 encodes agent context and map context (agent features and map features) as node encodings of a directed graph. In examples, the agent context characterizes the respective properties associated with each agent, such as agent behavior and physical features. In some embodiments, the agent context also characterizes a respective agent's relationship with other agents in the scene (e.g., social context). In examples, the map context characterizes the static properties of the environment, such as drivable areas, non-drivable areas, traffic control elements (e.g., traffic lights, stop signs), and the like.

The policy header 604 learns a policy for graph traversal. The policy maps states in the directed graph to a probability distribution over actions, which then generates a distribution over graph traversals. The policy is trained based on how the expert (ground truth) traversed the graph. The trajectory decoder 606 predicts a set of trajectories for agents (e.g., target vehicles in the scene) based on node encodings according to the policy learned by the policy header 604 and a sampled latent variable. In some examples, a target vehicle is an agent for which a set of predicted trajectories is generated. The graph encoder 602 further includes lane graph generator 608, gated recurrent unit (GRU) encoders 610, agent-node attention layer 612, and graph neural network (GNN) layers 614. As shown in FIG. 6, a graph with final node encodings is generated by the graph encoder 602 and input to the policy header 604 and the trajectory decoder 606. The graph encoder 602 is described in detail in FIG. 7, which further shows an example graph encoder 602. The policy header 604 is described in detail in FIG. 9, which further shows an example policy header 604. The trajectory decoder 606 is described in detail in FIG. 10, which further shows an example trajectory decoder 606.

Future trajectories of agents in the scene are predicted, conditioned on the respective past trajectories of the agents and an HD map of the scene. In some embodiments, future trajectories of vehicles of interest (e.g., a subset of agents) are predicted, conditioned on the past trajectory of the vehicles of interest, the past trajectories of nearby vehicles and pedestrians, and the HD map of the scene. The scene is represented in a bird's eye view, and predictions are made using the bird's eye view representation of the scene. An agent-centric frame of reference aligned along the agent's instantaneous direction of motion is used for predictions associated with each respective agent. For example, referring to FIG. 5, the trajectory 504 is shown at an agent-centric frame of reference aligned along the agent's instantaneous direction of motion.

Figure 7:
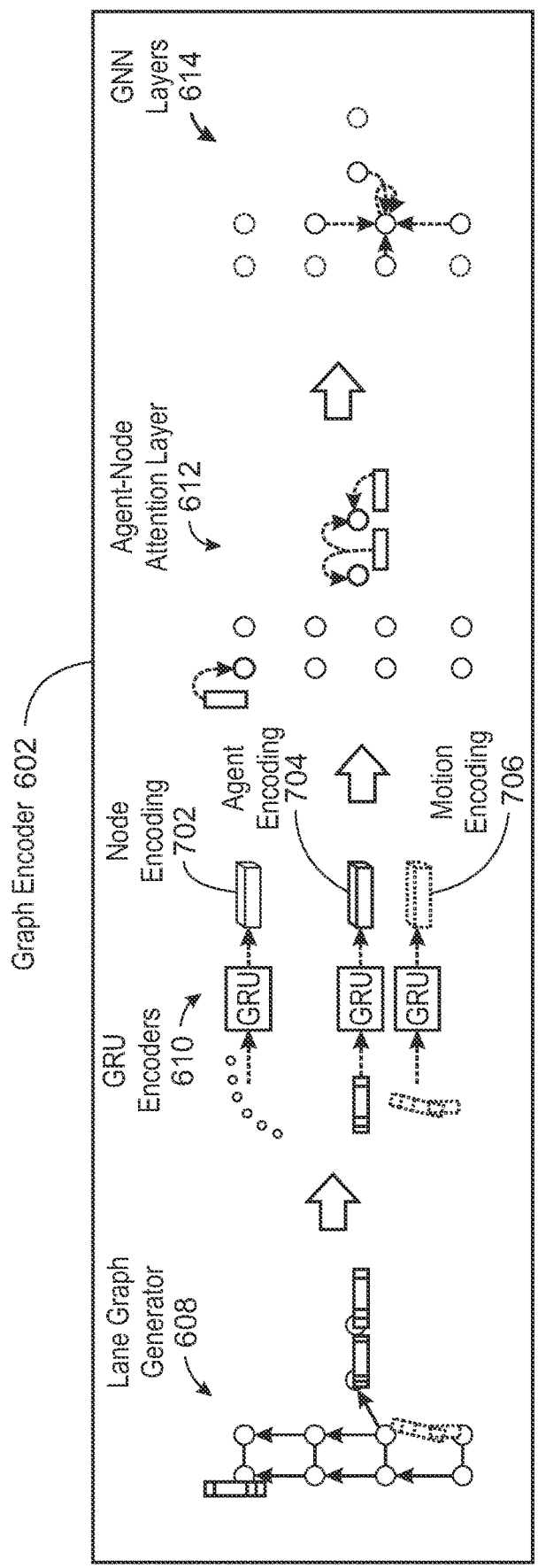
FIG. 7 illustrates an example graph encoder.

FIG. 7 illustrates an example graph encoder 602. The graph encoder 602 of FIG. 7 corresponds to the graph encoder 602 of FIG. 6. In the graph encoder 602, the lane graph generator 608 generates a directed graph g(V, E) including nodes and edges based on a high definition (HD) map of the driving scene. In some examples, one HD map corresponds to one directed graph. Graph structures generated by the graph encoder 602 are further described with respect to FIGS. 11A-11C.

Figure 8:
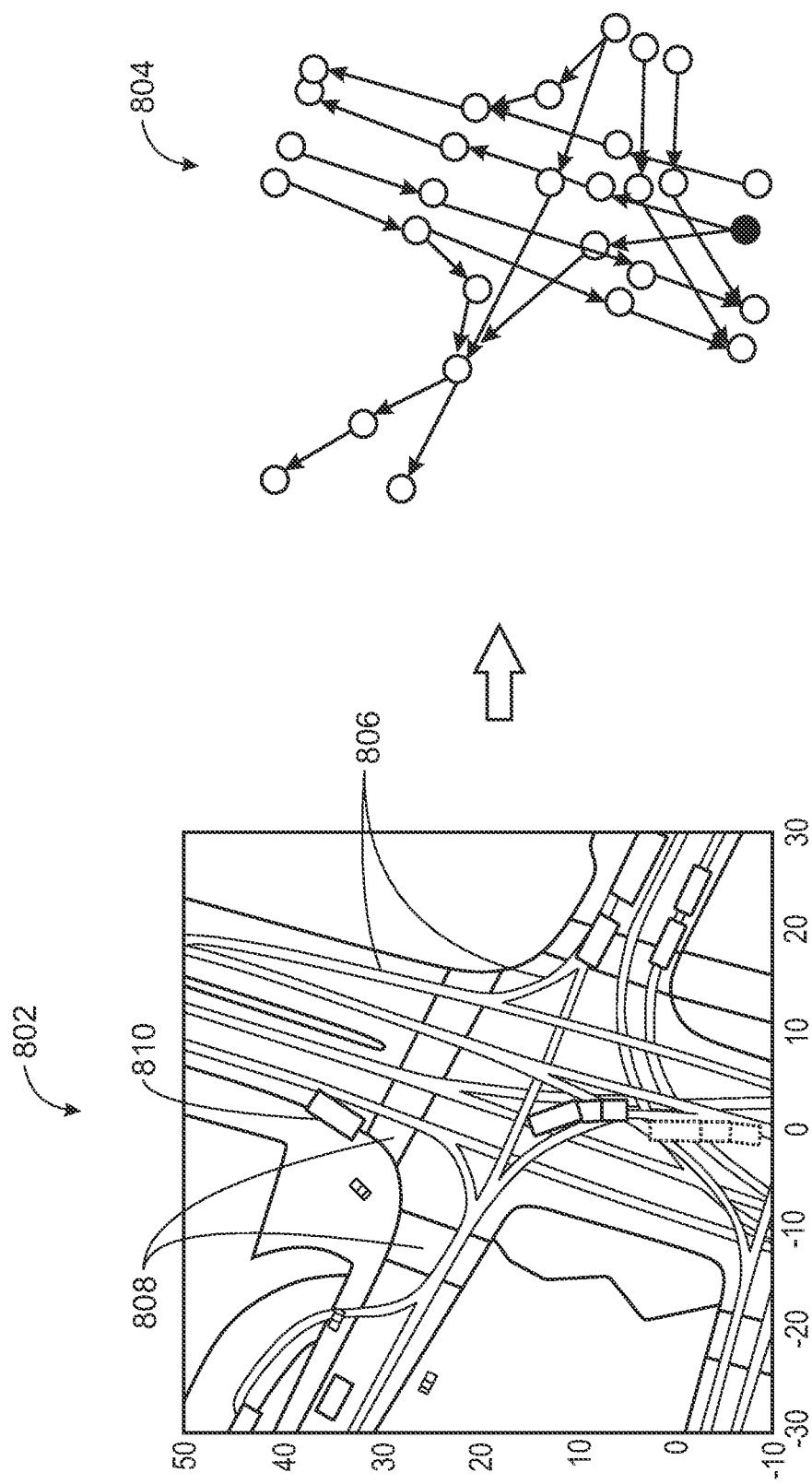
FIG. 8 illustrates an example HD map and an example directed graph corresponding to the example HD map.

HD maps of driving scenes provide a representation of the road topology and traffic rules. FIG. 8 illustrates an example HD map 802 and an example directed graph 804 corresponding to the example HD map 802. As shown in FIG. 8, the example HD map 802 includes lane 806 (represented by straight lines or polylines) and crosswalks and stop lines 808

(represented by polygons). A plurality of agents or road actors 810 are driving on the lane 806. The network of lane centerlines captures the direction of traffic flow and legal paths or routes that each driver can follow. The lane centerlines are represented as nodes (V) in the graph 804. To ensure that each node represents a lane segment of a similar length, longer lane centerlines are divided or split into smaller segments of a fixed length (e.g., the maximum length of each segment is 20 meters), and each segment is discretized to a set of N poses (e.g., each polyline is discretized at a one-meter resolution). In some embodiments, each segment corresponds to a node in the directed graph 804. Each node V is represented by a sequence of feature vectors $f_{1:n}^v = [f_1^v, \ldots, f_N^v]$, wherein each $f_n^v = [x_n^v, y_n^v, \theta_n^v, \mathcal{I}_n^v]$, $n \in [1,N]$, where $x_n^v$, $y_n^v$ and $\theta_n^v$ are the location and yaw of the $n^{th}$ pose of $\mathcal{V}$, and $\mathcal{I}_n^v$ is a 2-D binary vector indicating whether the pose lies on a stop line or crosswalk. Thus, the node features capture both the geometry (e.g., the contour of the lane) as well as traffic control elements (e.g., crosswalks, stop lines) along lane centerlines.

In some embodiments, edges in the directed graph 804 are arranged such that any traversed path through the graph corresponds to a legal route that a vehicle can take in the scene. There are two types of edges, i.e., successor edges and proximal edges. Successor edges ($E_{suc}$) connect a node to the next node along a lane. In some examples, successor edges connect a node to the next node along a same lane in the direction of travel. A given node can have multiple successor edges. For example, a node has multiple successor edges when a lane branches into multiple lanes at an intersection. Similarly, multiple nodes can have a same successor edge. For example, multiple nodes have the same successor edge when two or more lanes merge. Proximal edges ($E_{prox}$) connect a node in a first lane to a next node in a second lane. In this manner, proximal edges are used to account for lane changes. In examples, the proximal edges connect between neighboring lane nodes when the nodes are within a distance threshold of each other, and the direction of motion associated with each respective node is within a yaw threshold. The yaw threshold ensures that proximal edges are not erroneously assigned at intersections where multiple lanes cross each other.

In some embodiments, the directed graph 804 is generated for all lane centerlines within a fixed area of an HD map around a target vehicle (e.g., a vehicle of interest, e.g., one of the plurality of agents or road actors 810). For example, map elements within an area of [−50, 50] meters laterally and [−20, 80] meters longitudinally around the target vehicle can be used to generate a directed graph 804.

In some embodiments, past trajectories of agents 810 in the scene are obtained from onboard detectors and multi-object trackers. In examples, the past trajectory of agent i is represented as a sequence of motion state vectors $s_{-t_h:0}^i = [s_{-t_h}^i, \ldots, s_{-1}^i, s_0^i]$ over the past $t_h$ time steps. Each $s_t^i = [x_t^i, y_t^i, v_t^i, a_t^i, w_t^i, I^i]$, where $x_t^i$, $y_t^i$ mare the bird's-eye view (BEV) location coordinates, $v_t^i$, $a_t^i$ and $w_t^i$ are the speed, acceleration, and yaw rate of the agent at time t, and is an indicator (the value of 1 indicates pedestrians while the value of 0 indicates a vehicle).

Referring again to FIG. 6 and FIG. 7, GRU encoders 610 encode agent features, node features, and motion features to generate node encodings 702, agent encodings 704, and motion encodings 706. Both agent trajectories and lane polylines form sequences of features with a defined order, and are independently encoded using the GRU encoders 610. In some embodiments, three GRU encoders 610 are provided for encoding the target vehicle trajectory $s_{-t_h:0}^0$, surrounding vehicle trajectories $s_{-t_h:0}^i$ (vehicles surrounding the target vehicle), and initial node features $f_{1:N}^v$. The three GRU encoders 610 output the motion encoding $h_{motion}$ 702, agent encodings $h_{agent}^i$ 704, and initial node encodings $h_{node}^v$ 706, respectively.

In some embodiments, possible node encodings include location in an agent-centric frame (e.g., average (x,y) location of all points in lane segment), direction of motion (e.g., the difference in (x,y) between last and first points in lane segment; curvature; encoding centerline using 1D Convolution Neural Networks (CNN); Recurrent Neural Networks (RNN)), lane width/lateral distance to road boundary, and other scene elements (e.g., crosswalks, stop lines, road boundaries). In some embodiments, a binary flag can be used to indicate if a node lies on a crosswalk. A binary flag can be used to indicate the adjacent sidewalk to the left, and separately right. In some embodiments, if off-road trajectories are considered, there can be additional absorbing nodes at road boundaries where the policy ends.

In some embodiments, encoders 610 are RNN (Recurrent Neural Network) encoders, e.g., LSTMs (Long Short-Term Memory Networks) encoders.

The agent-node attention layer 612 updates the initial node encodings. Drivers (e.g., agents) cooperate with other drivers (e.g., agents) and pedestrians to navigate through traffic scenes. Thus, surrounding agents serve as a useful cue for trajectory prediction, since the surrounding agents might interact with the target vehicle's route or path. In some embodiments, the node encodings are updated with agent encodings using scaled dot product attention. In examples, attention weights are calculated by normalizing the output score of a feed-forward neural network described by the function that captures the alignment between input at j and output at i. The agent-node attention layer generates node embeddings that take the context of the surrounding agents into account. In examples, the agent-node attention layer 612 computes three vectors (query, key, and value) for each agent. To update the node encodings with the agent encodings, the dot products of an agent's query vector with the key vectors of every other agent are determined.

In some embodiments, the agent encodings corresponding to nearby agents within a distance threshold of each node are considered for updates to the initial node encoding. This enables the trajectory decoder 606 to selectively focus on agents that might interact with predicted trajectories of the target vehicle. Keys and values are obtained by linearly projecting encodings $h_{agent}^i$ of nearby agents, while the query is obtained by linearly projecting $h_{node}^i$. In some embodiments, the updated node encoding is obtained by concatenating the output of the agent-node attention layer 612 with the initial node encoding.

The GNN layers 614 aggregate local context from neighboring nodes and output a final node encoding. In some examples, the GNN layers 614 are neural models (e.g., GNNs) that capture the dependence of graphs via message passing between the nodes of graphs. In some examples, a GNN is an optimizable transformation on all attributes of the graph (nodes, edges, and global-context) that preserves graph symmetries (permutation invariances). The GNN takes as input a graph with initial node encodings associated with the nodes, edges, and context information. The encodings are progressively transformed without changing the connectivity of the input graph. In this manner, a directed graph with node encodings is generated for all lane centerlines within a fixed area of an HD map around a target vehicle. In some embodiments, the GNN layers 614 are graph convolution network (GCN) layers or graph attention network (GAT) layers that aggregate local context from neighboring nodes. In some embodiments, the agent context and map context are aggregated using GCN network layers as described with respect to FIG. 12. Additionally, in some embodiments, successor edges and proximal edges are treated as equivalent and bidirectional, which enables aggregating context in all directions around each node. The outputs of the GNN layers 614 serve as the final node encodings learned by the graph encoder 602.

Figure 9:
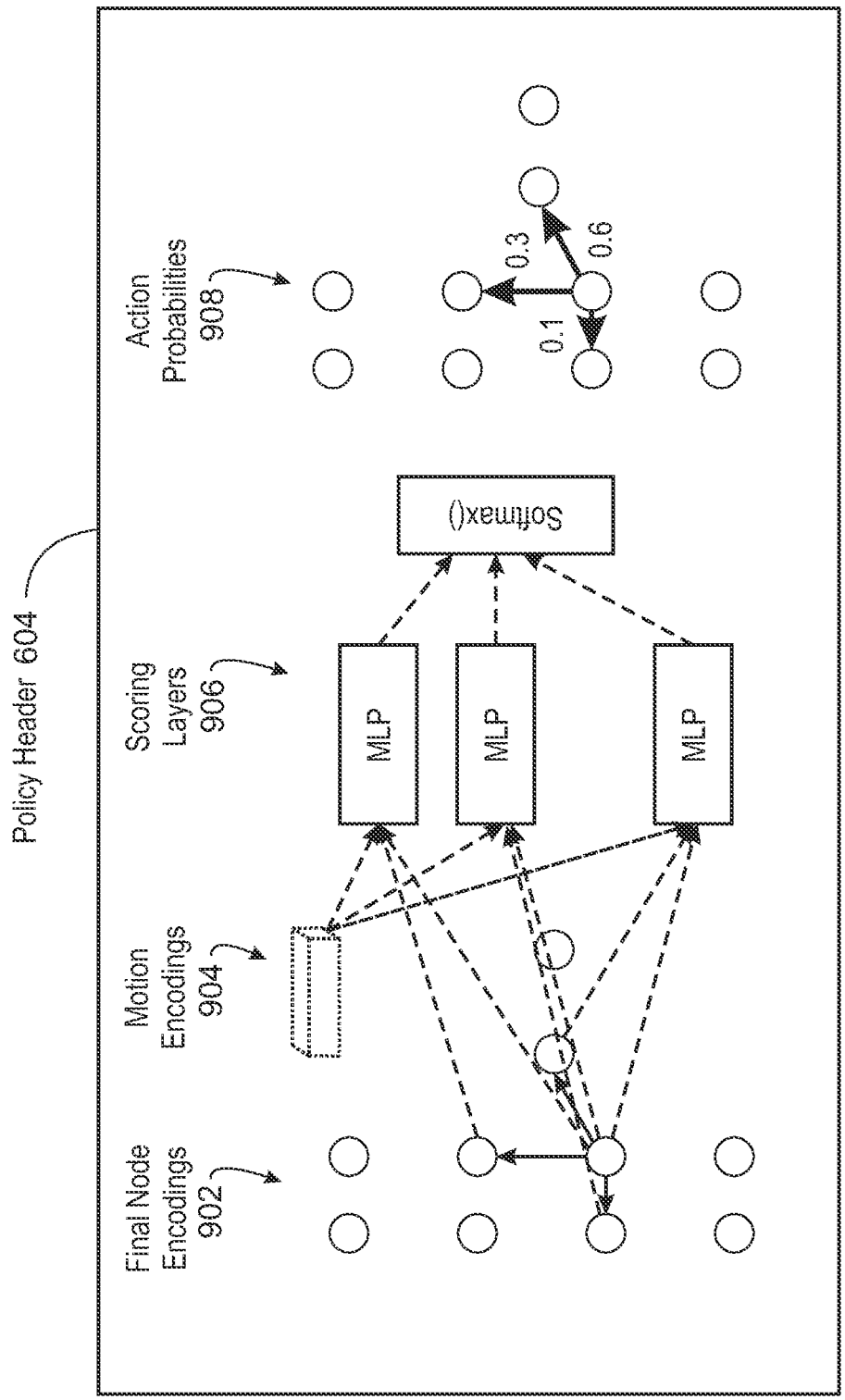
FIG. 9 illustrates an example policy header.

FIG. 9 illustrates an example policy header 604. The example policy header 604 is used to output a discrete probability distribution 908 over outgoing edges (e.g., successor edges, proximal edges) at each node, enabling sampling of paths in the directed graph 804 (FIG. 8) that are the most likely routes that a target vehicle will take in the future. Every path in the directed graph 804 (FIG. 8) corresponds to a plausible route for the target vehicle. However, not every route has an equal possibility of being the route the target vehicle will take. For example, the past motion of the target vehicle approaching an intersection might indicate that the target vehicle is preparing to make a turn rather than go straight. In examples, a slow-moving lane makes it more likely for a target vehicle to change a lane rather than maintain the same lane. For ease of explanation, the policy is described as a discrete probability distribution. However, in some embodiments, the policy header 604 learns a policy for graph traversal according to a reward model (e.g., reward model 1300 of FIG. 13).

A policy $\pi_{route}$ is learned for graph traversal, such that sampled roll-outs of the policy correspond to likely routes or paths that the target vehicle would take in the future. In some embodiments, a roll-out is a simulated outcome of a policy (e.g., state-to-action mapping) that produces a trajectory sample. The policy is represented as a discrete probability distribution 908 over outgoing edges at each node. The edges from every node to an end state are included to enable the policy $\pi_{route}$ to terminate at a goal location. The edge probabilities are output by the policy header 604. In the policy header 604, final node encodings 902 and motion encodings 904 for a target vehicle are obtained from a directed graph (e.g., directed graph 804 of FIG. 8). The policy header 604 includes scoring layers 906. The scoring layers 906 include a multilayer perceptron (MLP) network with shared weights that outputs a scalar score for each edge (u, v) Equation 1 for calculating the scalar score is provided below:

$$\text{score}(u,v) = \text{MLP}(\text{concat}(h_{motion}, h_{node}^u, h_{node}^v)_{(u,v) \in E_{suc}})). \quad (1)$$

The scoring function thus takes into account the motion of the target vehicle as well as the local scene and agent context at a specific edge. The scores are normalized using a softmax layer for all outgoing edges at each node to output the policy for graph traversal. Equation 2 for outputting the policy distribution 908 is provided below:

$$\pi_{route}(v|u) = \text{softmax}(\{\text{score}(u,v)|(u,v) \in E\}). \quad (2)$$

In some embodiments, policy header 604 is trained using behavior cloning. For each prediction instance, a ground truth trajectory is used to determine which nodes were visited by the target vehicle. In some embodiments, nodes whose direction of motion is within a yaw threshold of the target vehicle's pose are considered in the current predictions. An edge (u, v) is treated as visited if both nodes u and v are visited. A negative log likelihood of the edge probabilities for all edges visited by the ground truth trajectory ($E_{gt}$) is used as the loss function for training the graph traversal policy. Equation 3 for outputting the loss function is provided below:

$$\mathcal{L}_{BC} = \sum_{(u,v) \in E_{gt}} -\log(\pi_{route}(v|u)). \quad (3)$$

Referring again to FIG. 6, the trajectory decoder 606 is used to output predicted trajectories conditioned on paths traversed in the directed graph output by the graph encoder according to the policy output by the policy header 604 and a sampled latent variable.

Figure 10:
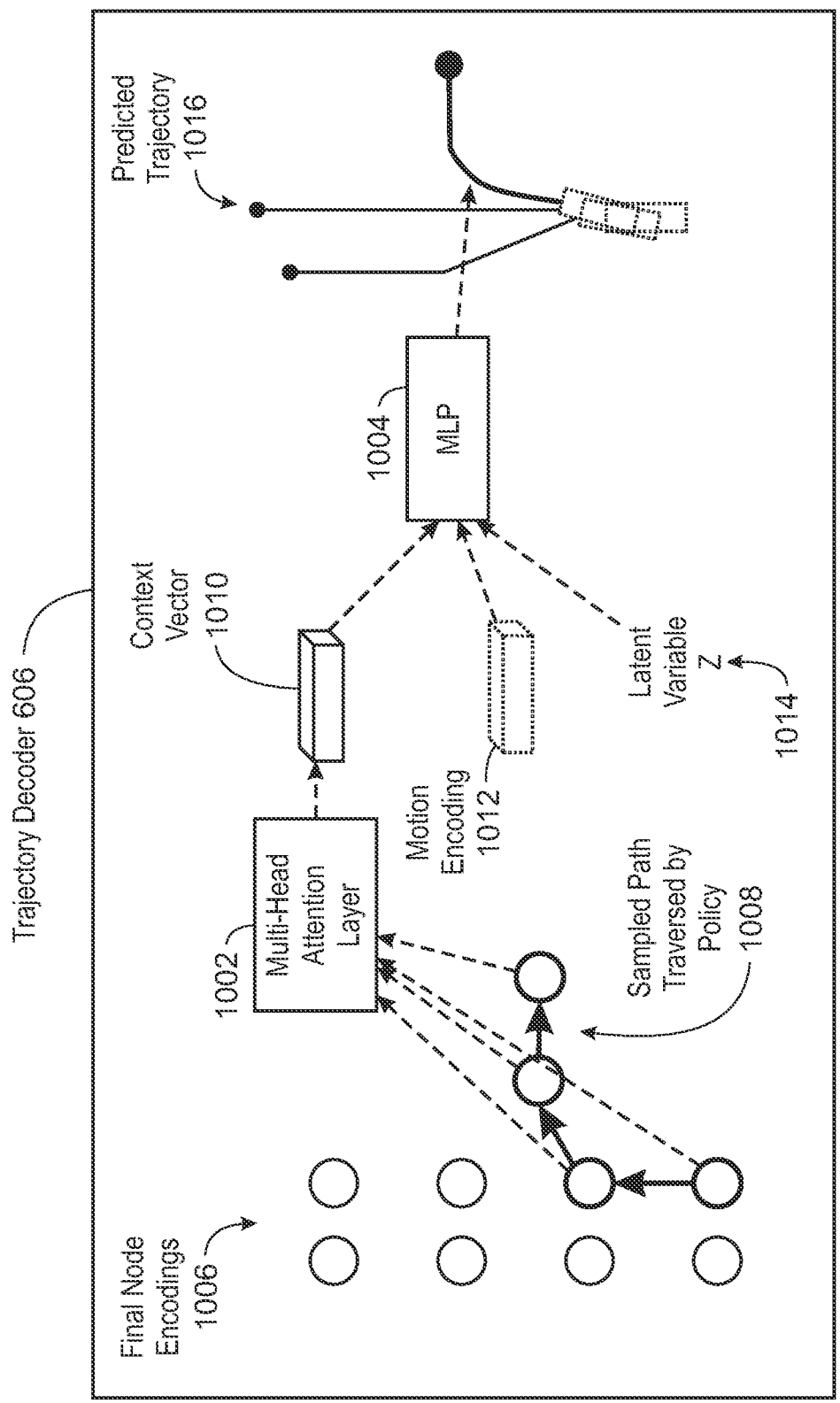
FIG. 10 illustrates an example trajectory decoder.

FIG. 10 illustrates an example trajectory decoder 606. Sampling roll-outs of the policy $\pi_{route}$ yields plausible future routes or paths for the target vehicle based on the final node encodings 1006. In some embodiments, the most relevant context for predicting future trajectories is along these routes. The example trajectory decoder 606 selectively aggregates context along the sampled routes or paths using a multi-head attention layer 1002.

In some embodiments, given a sequence of nodes [$v_1$, $v_2$, ..., $v_M$] corresponding to a sampled policy roll-out 1008, the example trajectory decoder 606 uses multi-head scaled dot product attention to aggregate map and agent context over the node sequence as shown in FIG. 10. The target vehicle's motion encoding is linearly projected to obtain the query, while the node features [$h_{node}^{v_1}$, $h_{node}^{v_2}$, ..., $h_{node}^{v_M}$] are linearly projected to obtain keys and values for computing attention. The multi-head attention layer 1002 outputs a context vector $\mathcal{C}$ 1010 that encodes contexts along sampled paths traversed according to the policy. Each distinct policy roll-out yields a distinct context vector $\mathcal{C}$, enabling the prediction of trajectories along a diverse set of routes. Diversity in routes alone does not account for the multimodality of future trajectories. Drivers (e.g., agents) can brake, accelerate or/and follow different motion profiles (e.g., position, velocity, or/and acceleration) along a planned route. In some embodiments, to enable the trajectory decoder 606 to output distinct motion profiles, the trajectory predictions 1016 are further conditioned on a sampled latent variable Z 1014. Unlike routes, vehicle velocities and accelerations vary on a continuum. In some embodiments, latent variable Z 1014 is sampled from a continuous distribution. In some embodiments, the latent variable Z 1014 is modeled as multivariate standard normal distribution.

To predict a trajectory $T_{1:t_f}^k$, a roll-out of $\pi_{route}$ is sampled to obtain $\mathcal{C}_k$, and $z_k$ is sampled from the latent distribution. $\mathcal{C}_k$ and $z_k$ are concatenated with $h_{motion}$, and $\mathcal{C}_k$, $z_k$, $h_{motion}$ are passed through an MLP 1004 to output $T_{1:t_f}^k$, which are the future locations (e.g., x and y coordinates) over $t_f$ time steps (e.g., a prediction horizon). Equation 4 for outputting $T_{1:t_f}^k$ is provided below:

$$T_{1:t_f}^k = \text{MLP}(\text{concat}(h_{motion}, \mathcal{C}_k, z_k)). \quad (4)$$

The sampling process can often be redundant, yielding similar or repeated trajectories. However, the lightweight encoder and decoder heads enable sampling of a large number of trajectories in parallel.

To obtain a final set of K modes of the trajectory distribution, K-means clustering is used to output the cluster centers as the final set of K predictions [$T_{1:t_f}^1$, $T_{1:t_f}^2$, ..., $T_{1:t_f}^K$].

The trajectory decoder 606 is trained using the winner-take-all average displacement error with respect to the ground truth trajectory ($T^{gt}$) in order not to penalize the diverse plausible trajectories output by the trajectory decoder 606. Equation 5 for outputting the loss function (e.g., regression loss) is provided below:

$$\mathcal{L}_{reg} = \min_k \frac{1}{t_f} \sum_{t=1}^{t_f} \|\tau_t^k - \tau_t^{gt}\|_2. \tag{5}$$

The trajectory decoder 606 is trained end-to-end using a multi-task loss combining losses from Equation 3 and Equation 5. Equation 6 for combining the loss function is provided below.

$$\mathcal{L} = \mathcal{L}_{BC} + \mathcal{L}_{reg}. \tag{6}$$

Figure 11:
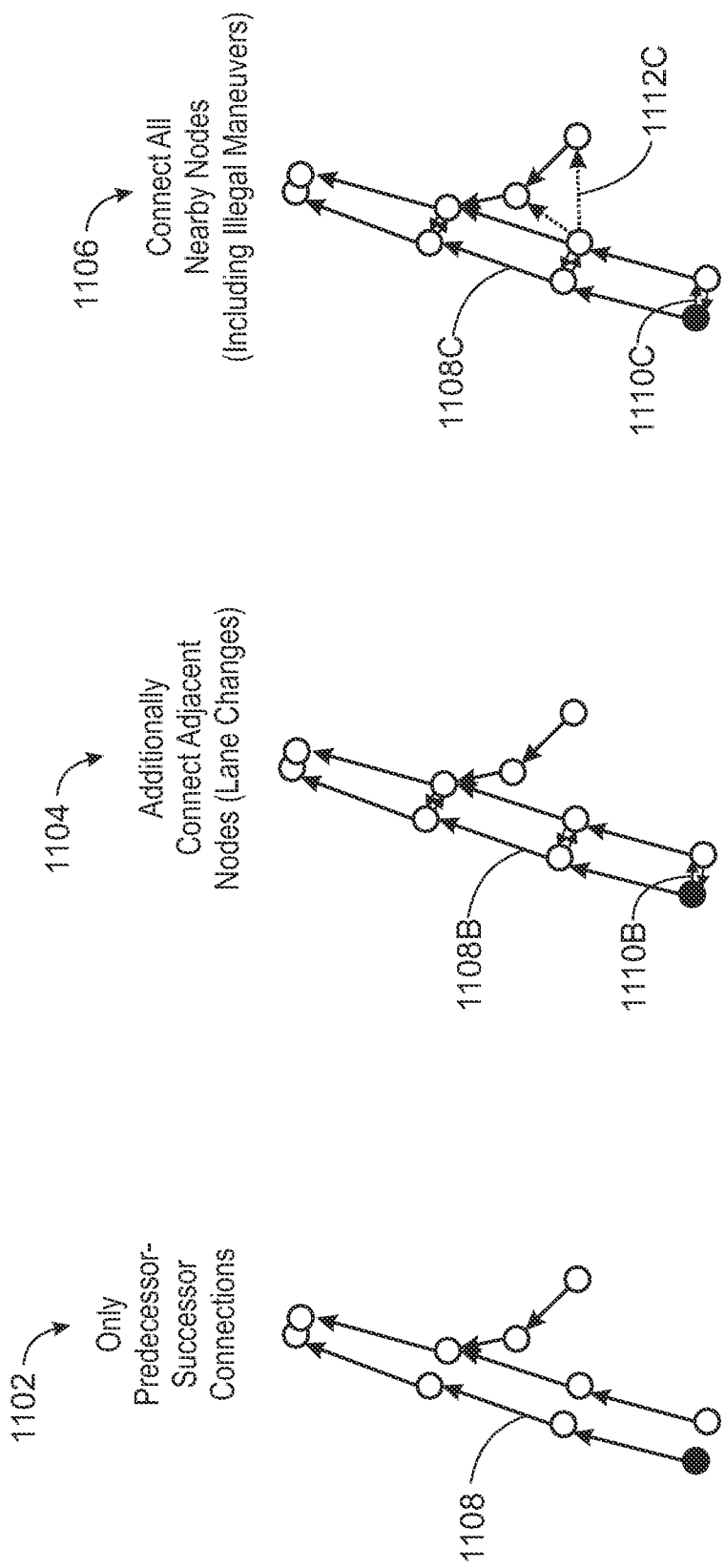
FIG. 11A-11C illustrate three example directed graphs generated by the lane graph generator, respectively.

FIG. 11A-11C illustrate three example directed graphs with graph structures generated by the lane graph generator 608 of FIGS. 6 and 7. In the example of FIG. 11A, the directed graph 1102 includes successor edges 1108, each successor edge connecting a node to the next node along a lane. Thus, the directed graph 1102 of FIG. 11A is structured with predecessor-successor connections among nodes. The directed graph structure 1102 of FIG. 11A does not include edges that represent lane changes or illegal maneuvers. In the example of FIG. 11B, the directed graph 1104 includes successor edges 1108B and proximal edges 1110B that connect adjacent nodes for lane changes. In the example of FIG. 11C, the directed graph 1106 includes successor edges 1108C, proximal edges 1110C, and edges that represent illegal maneuvers 1112C (e.g., paths that are incompliant with traffic laws). The directed graph 1106 connects all nearby nodes.

Figure 12:
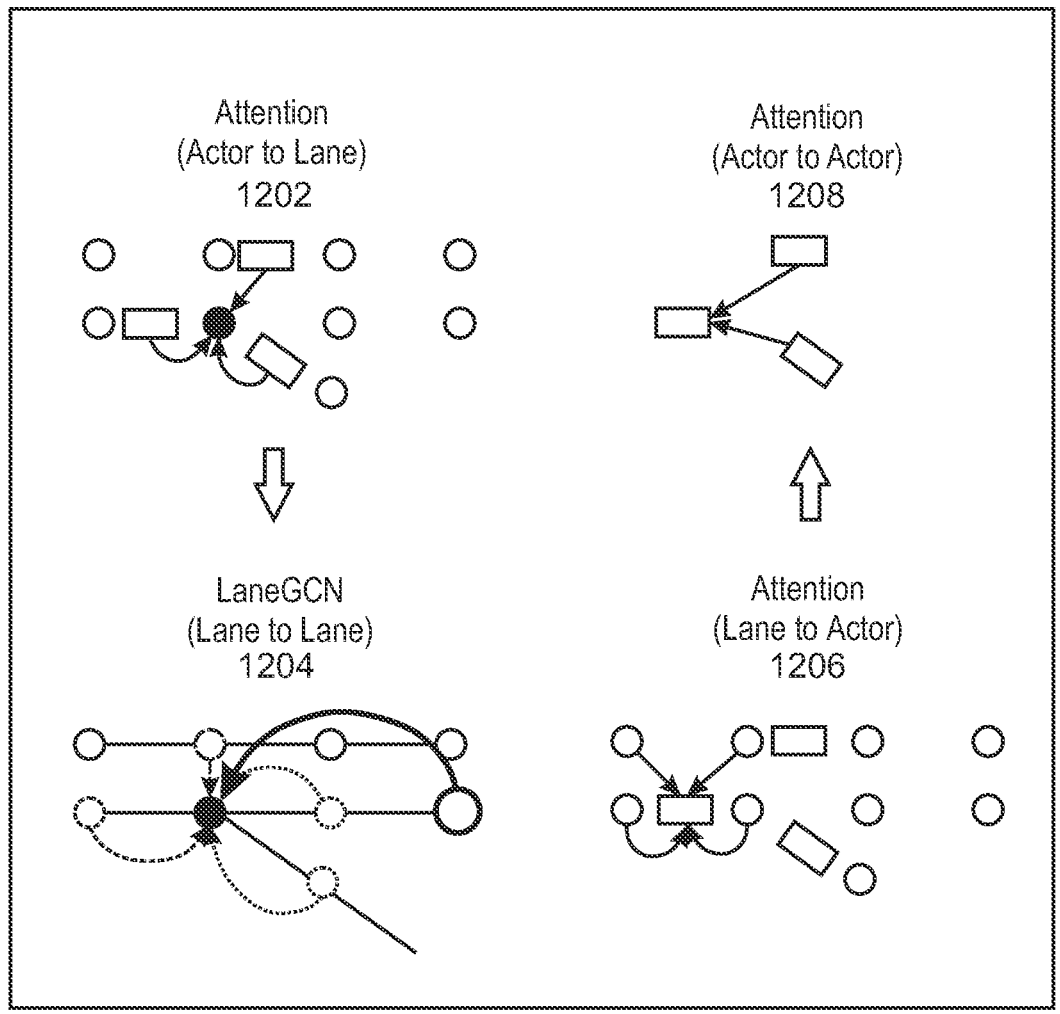
FIG. 12 illustrates aggregation of agent context and map context, according to implementations of this disclosure.

FIG. 12 illustrates the aggregation of agent context and map context using graph convolution. As shown in FIG. 12, "Actor-to-Lane" context aggregation 1202 propagates real-time traffic information from agents to lane features. For example, the real time traffic information includes a lane being occupied by an agent. "Lane-to-Lane" context aggregation 1204 propagates the traffic information along plausible paths of the lane graph. "Lane-to-Actor" context aggregation 1206 fuses the latest lane information from the scene to the agent. "Actor-to-Actor" context aggregation 1208 propagates real-time information between agents. In some embodiments, contexts are aggregated using GCN (graph convolutional networks) layers with dilated convolutions. Different edge types can encode direction with different learnable weights. In this manner, the agent context is encoded in node features. The dilated graph convolutions propagate features over longer distances along the lane.

Figure 13:
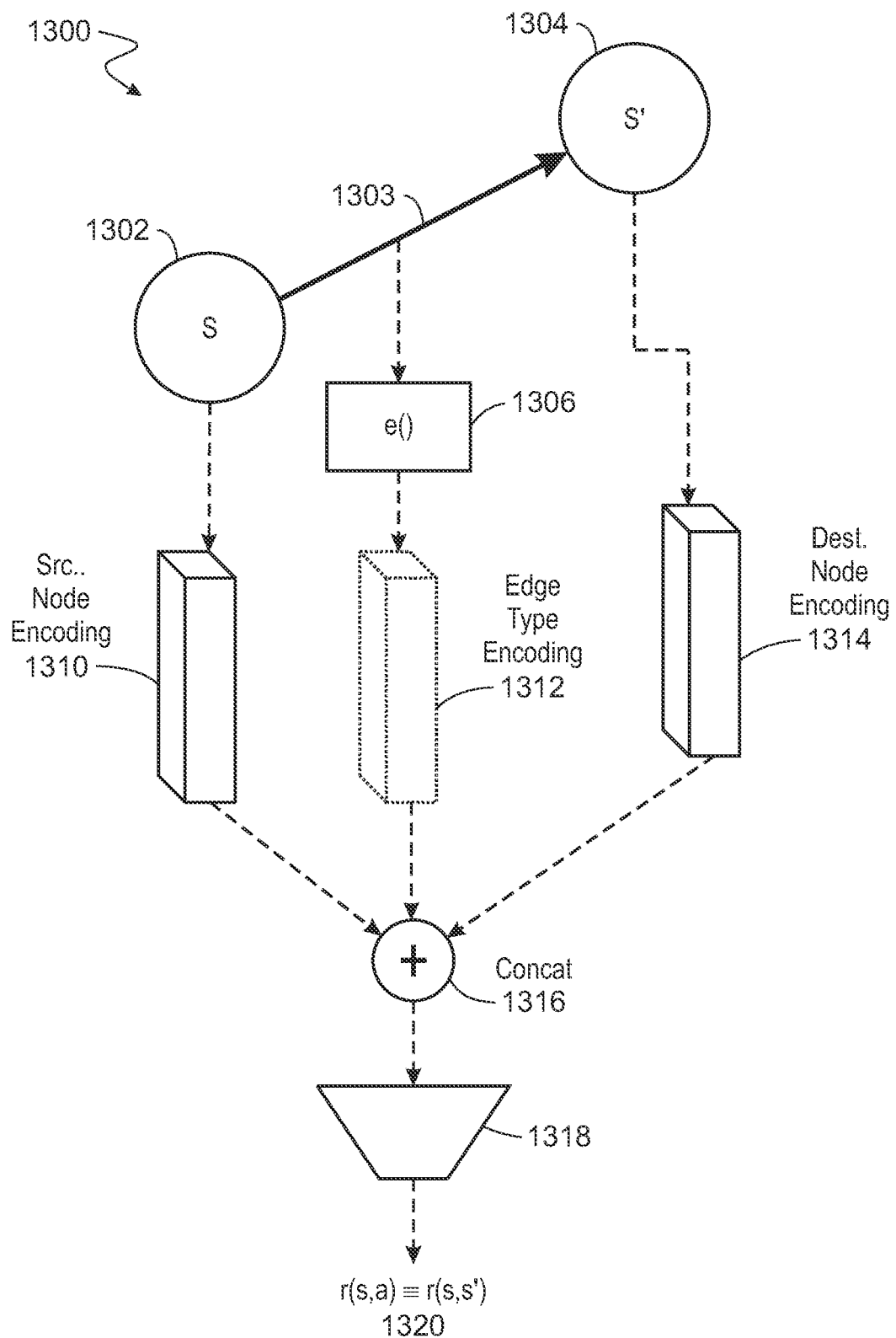
FIG. 13 illustrates an example reward model that can be used in the policy header.

FIG. 13 illustrates an example reward model 1300 that determines a policy the policy header (e.g., policy header 604). The reward model 1300 includes state space that includes node S 1302 and a node S' 1304 and action space 1303 (edges). Once an edge is selected, the next node is deterministic (e.g., deterministic dynamics T(s, a)). The reward model 1300 is used to discourage or encourage certain state transitions, rather than specific states. The reward model can be represented by Equation 7 below:

$$r(s,a) = Net(\phi_S, \phi_{S'}, e(c_{edge})) \tag{7}$$

Where $\phi_S$ is the node encoding 1310 from GCN. The next node S' 1302 is determined by applying an edge to the current node S 1302, or s'=a). The; $c_{edge}$ is a one hot encoding of edge type, and e( ) 1306 is the fully-connected (FC) embedding layer used to obtain the edge type encoding 1312. The node encodings of the source node 1310, the edge type encoding 1312, and the destination node encodings 1314 are concatenated 1316. A network 1318 is applied to the concatenated node encodings 1310, 1314 and the edge type encoding 1312. In some embodiments, the network 1318 includes ix' convolution layers with weights shared for all nodes. The output is a reward value 1320 associated with the edge 1303.

During training of the reward model 1300, V(s) and Q(s,a) for current reward $r_w$(s, a) 1320 is estimated using soft value iteration. In examples, a maximum entropy (MaxEnt) policy is used for training, and Equation 8 for the MaxEnt policy is provided below:

$$p_w(a|s) \propto \exp(Q(s,a) - V(s)) \tag{8}$$

The state-action $D_W$(s, a) visitation frequencies are computed for $p_W$( ). The backpropagation is computed as $D_{GT}$(s, a)−$D_W$(s, a), where $D_{GT}$(s, a) is the ground truth state-action visitation frequencies. Once $r_w$(s, a) is obtained, during inference, estimation of V(s) and Q(s,a) and MaxEnt policy are repeated to determine a policy and sample roll-outs of the policy to traverse the graph and assign probabilities.

As described above, once an edge is selected, the next node is deterministic (e.g., deterministic dynamics T(s, a)). In some embodiments, dynamics are incorporated into the reward model. For example, a second encoder-decoder model is used to generate trajectories. In this example for each node along a sampled path in the graph, node features are encoded using the second encoder. A second decoder obtains the node encodings from the second encoder and outputs velocities along and across a centerline over time. In examples, the velocities are output in a frenet frame with respect to a centerline.

In some embodiments, fixed motion profiles are used to determine nodes and edges to generate trajectories when determining a next node using the reward model. Using fixed motion profiles, lane centerlines are concatenated for a sampled path in a graph. A smoothing spline is used for adjacent or illegal edges to determine a centerline. Constant velocity or constant acceleration motion profiles are used to get trajectories.

In some embodiments, discrete acceleration values are added to each action (e.g., edge) and discrete velocities are added to each state (e.g., nodes) in the reward model. Instead of fixed motion profiles, K discrete acceleration values are included in the action. In embodiments, the reward model 1300 outputs K values for each node feature/acceleration value pair. The acceleration values are sampled along with the next node according to the policy, and the acceleration values are used to predict trajectories along centerlines.

Figure 14:
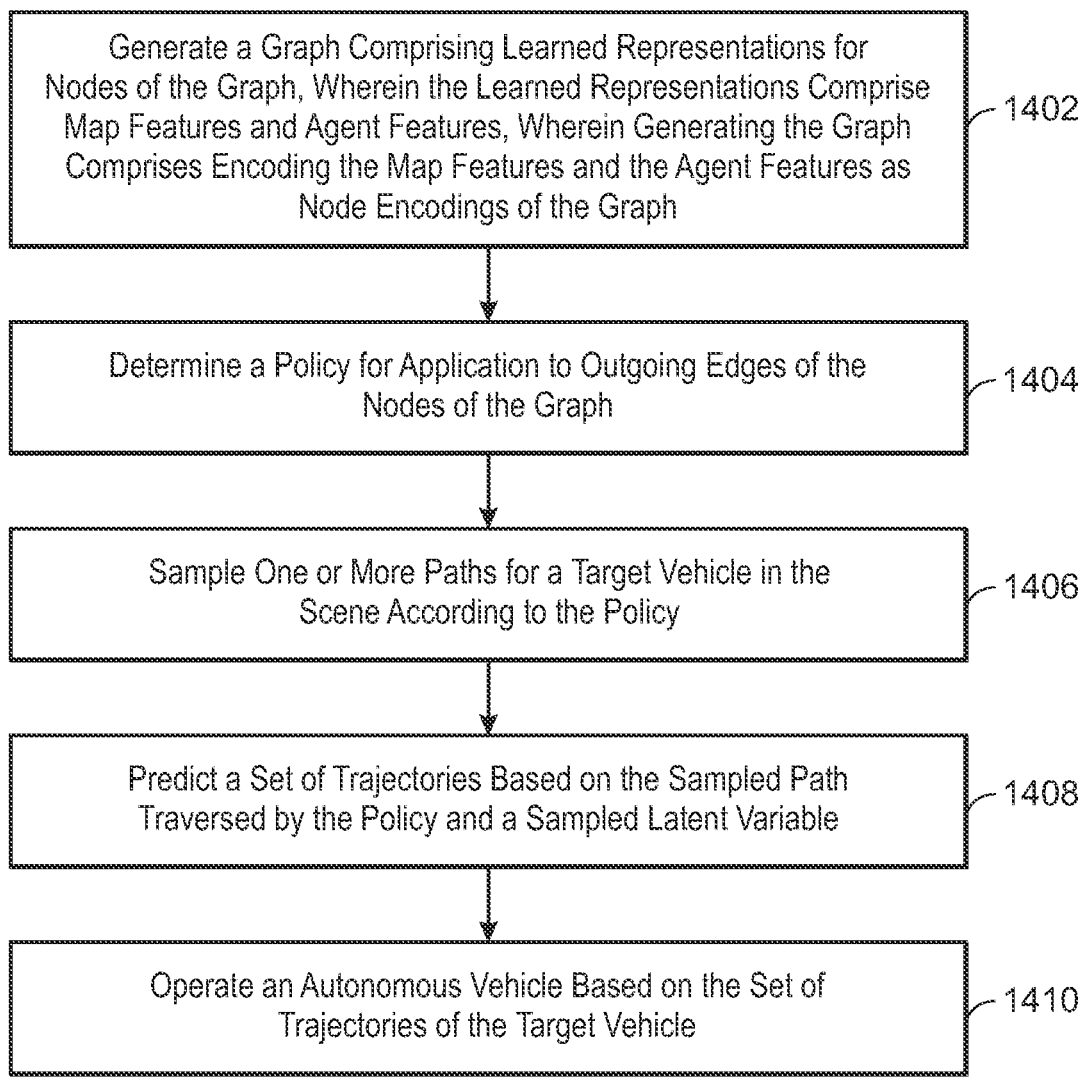
FIG. 14 illustrates an example process of predicting a trajectory for an agent

FIG. 14 illustrates an example process 1400 of predicting a trajectory for an agent. In some embodiments, process 1400 is implemented (e.g., completely, partially, etc.) using an autonomous system that is the same as or similar to autonomous system 202, described in reference to FIG. 2. In some embodiments, one or more of the steps of process 1400 are performed (e.g., completely, partially, and/or the like) by another device or system, or another group of devices and/or systems that are separate from, or include, the autonomous system. For example, one or more steps of process 1400 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of process

1400 may be performed between any of the above-noted systems in cooperation with one another.

At block 1402, a directed graph is generated by encoding the map features and the agent features as node encodings of the directed graph. In some embodiments, the graph includes learned representations for nodes for the graph including map features and agent features. Generating the graph includes encoding the map features and agent features as node encodings for each node of the graph. The directed graph includes learned representations for nodes of the graph. The learned representations include map features and agent features.

At block 1404, a policy is determined. A policy is determined for application to outgoing edges of the nodes of the graph. In some embodiments, the policy is a probability distribution discrete probability distribution over outgoing edges at each node with respect to a target vehicle.

In some embodiments, the policy is based on a reward model. At block 1406, one or more paths are sampled for a target vehicle in the scene according to the policy. At block 1408, a set of trajectories are predicted based on the sampled path traversed by the policy and a sampled latent variable. At block 1410, an AV is operated based on the set of trajectories predicted for the target vehicle.

According to some non-limiting embodiments or examples, provided is a method, comprising: generating, using at least one processor, a graph corresponding to a map of a scene by encoding map features and agent features as node encodings of the graph; determining, using the at least one processor, a policy for application to outgoing edges at nodes of the graph; sampling, using the at least one processor, paths for a target vehicle in the scene according to the policy; predicting, using the at least one processor, a set of trajectories based on the sampled paths traversed by the policy and a sampled latent variable; and operating, using the at least one processor, a vehicle based on the set of trajectories of the target vehicle.

According to some non-limiting embodiments or examples, provided is a system, comprising: a graph encoder to encode high definition maps and agent features into a graph for generating final node encodings; wherein the graph includes nodes and edges, the nodes representing segments of a lane centerline and edges representing transitions between nodes, wherein the graph is used to generate final node encodings; a policy header to learn a policy for sampled graph traversals based on a motion of a target vehicle as well as local scene and agent context at neighboring nodes; and a trajectory decoder to predict trajectories based on node encodings along paths traversed by the policy and a sampled latent variable.

According to some non-limiting embodiments or examples, provided is at least one non-transitory computer-readable medium storing instructions that, when executed by at least one processor, cause the at least one processor to: generate a graph corresponding to a map of a scene by encoding map features and agent features as node encodings of the graph; determine a policy for application to outgoing edges at nodes of the graph; sample paths for a target vehicle in the scene according to the policy; predict a set of trajectories based on the sampled paths traversed by the policy and a sampled latent variable; and operate a vehicle based on the set of trajectories of the target vehicle.

Clause 1: A method comprising: generating, using at least one processor, a graph corresponding to a map of a scene by encoding map features and agent features as node encodings of the graph; determining, using the at least one processor, a policy for application to outgoing edges at nodes of the graph; sampling, using the at least one processor, paths for a target vehicle in the scene according to the policy; predicting, using the at least one processor, a set of trajectories based on the sampled paths traversed by the policy and a sampled latent variable; and operating, using the at least one processor, a vehicle based on the set of trajectories of the target vehicle.

Clause 2: The method of clause 1, wherein a respective node corresponds to a segment of a lane centerline of the map.

Clause 3: The method of clauses 1 or 2, further comprising updating the node encodings with surrounding agent encodings by calculating scaled dot product attention weights.

Clause 4: The method of any one of clauses 1-3, comprising aggregating local context from neighboring nodes into the node encodings of the graph using a graph neural network.

Clause 5: The method of any one of clauses 1-4, wherein the policy for application to the outgoing edges is a discrete probability distribution over the outgoing edges at the nodes of the graph.

Clause 6: The method of any one of clauses 1-5, wherein the policy is predicted by training a multilayer perceptron (MLP) using behavior cloning.

Clause 7: The method of any one of clauses 1-6, comprising selectively aggregating context along the sampled paths, and predicting the set of trajectories based on the sampled paths traversed by the policy, the aggregated context, and the sampled latent variable.

Clause 8: The method of clause 7, wherein predicting the set of trajectories comprises: concatenating the aggregated context and the sampled latent variable with motion encodings; and inputting the concatenated aggregated context and the sampled latent variable to a multilayer perceptron, wherein the set of trajectories indicates predicted locations at future time steps.

Clause 9: A system, comprising: a graph encoder to encode high definition maps and agent features into a graph for generating final node encodings; wherein the graph includes nodes and edges, the nodes representing segments of a lane centerline and edges representing transitions between nodes, wherein the graph is used to generate final node encodings; a policy header to learn a policy for sampled graph traversals based on a motion of a target vehicle as well as local scene and agent context at neighboring nodes; and a trajectory decoder to predict trajectories based on node encodings along paths traversed by the policy and a sampled latent variable.

Clause 10: The system of clause 9, wherein the policy is a discrete probability distribution of transitions associated with a respective edge at a respective node.

Clause 11: The system of clauses 9 or 10, wherein the graph encoder includes one or more gated recurrent units to encode target vehicle trajectories, surrounding vehicle trajectories, and node features.

Clause 12: The system of any one of clauses 9-11, the trajectory decoder comprising a multi-head attention layer that outputs a context vector for each policy, wherein the context vector is combined with motion encodings and the sampled latent variable to predict the trajectories.

Clause 13: The system of any one of clauses 9-12, wherein initial node encodings are updated with surrounding agent encodings by calculating scaled dot product attention weights to generate the final node encodings.

Clause 14: The system of any one of clauses 9-13, wherein the graph encoder is configured to aggregate local context from neighboring nodes into the final node encodings of the graph using a graph neural network.

Clause 15: At least one non-transitory storage medium storing instructions that, when executed by at least one processor, cause the at least one processor to: generate a graph corresponding to a map of a scene by encoding map features and agent features as node encodings of the graph; determine a policy for application to outgoing edges at nodes of the graph; sample paths for a target vehicle in the scene according to the policy; predict a set of trajectories based on the sampled paths traversed by the policy and a sampled latent variable; and operate a vehicle based on the set of trajectories of the target vehicle.

Clause 16: The at least one non-transitory storage medium of clause 15, wherein a respective node corresponds to a segment of a lane centerline of the map.

Clause 17: The at least one non-transitory storage medium of clause 15 or 16, comprising updating the node encodings with surrounding agent encodings by calculating scaled dot product attention weights.

Clause 18: The at least one non-transitory storage medium of any one of clauses 15-17, comprising aggregating local context from neighboring nodes into the node encodings of the graph using a graph neural network.

Clause 19: The at least one non-transitory storage medium of any one of clauses 15-18, wherein the policy for application to the outgoing edges is a discrete probability distribution over the outgoing edges at nodes of the graph.

Clause 20: The at least one non-transitory storage medium of any one of clauses 15-19, wherein the policy is predicted by training a multilayer perceptron (MLP) using behavior cloning.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    generating, using at least one processor, a graph corresponding to a map of a scene by encoding map features and agent features as node encodings of the graph;
    determining, using the at least one processor, a policy for application to outgoing edges at nodes of the graph;
    sampling, using the at least one processor, paths for a target vehicle in the scene according to the policy;
    predicting, using the at least one processor, a set of trajectories based on the sampled paths traversed by the policy and a sampled latent variable; and
    operating, using the at least one processor, a vehicle based on the set of trajectories of the target vehicle,
    wherein predicting the set of trajectories comprises:
        outputting a context vector for the policy using a multi-head attention layer; and
        combining the context vector with motion encodings and the sampled latent variable to predict the set of trajectories.

2. The method of claim 1, wherein a respective node corresponds to a segment of a lane centerline of the map.

3. The method of claim 1, further comprising updating the node encodings with surrounding agent encodings by calculating scaled dot product attention weights.

4. The method of claim 1, comprising aggregating local context from neighboring nodes into the node encodings of the graph using a graph neural network.

5. The method of claim 1, wherein the policy for application to the outgoing edges is a discrete probability distribution over the outgoing edges at the nodes of the graph.

6. The method of claim 1, wherein the policy is predicted by training a multilayer perceptron (MLP) using behavior cloning.

7. The method of claim 1, comprising selectively aggregating context along the sampled paths, and predicting the set of trajectories based on the sampled paths traversed by the policy, the aggregated context, and the sampled latent variable.

8. The method of claim 7, wherein predicting the set of trajectories comprises:
    concatenating the aggregated context and the sampled latent variable with the motion encodings; and
    inputting the concatenated aggregated context and the sampled latent variable to a multilayer perceptron, wherein the set of trajectories indicates predicted locations at future time steps.

9. A system, comprising:
    a graph encoder to encode high definition maps and agent features into a graph for generating final node encodings, wherein the graph includes nodes and edges, the nodes representing segments of a lane centerline and edges representing transitions between nodes, wherein the graph is used to generate the final node encodings;
    a policy header to learn a policy for sampled graph traversals based on a motion of a target vehicle as well as local scene and agent context at neighboring nodes; and
    a trajectory decoder to predict trajectories based on node encodings along paths traversed by the policy and a sampled latent variable, wherein the trajectory decoder comprising a multi-head attention layer configured to output a context vector for the policy, wherein the context vector is combined with motion encodings and the sampled latent variable to predict the trajectories.

10. The system of claim 9, wherein the policy is a discrete probability distribution of transitions associated with a respective edge at a respective node.

11. The system of claim 9, wherein the graph encoder includes one or more gated recurrent units to encode target vehicle trajectories, surrounding vehicle trajectories, and node features.

12. The system of claim 9, wherein initial node encodings are updated with surrounding agent encodings by calculating scaled dot product attention weights to generate the final node encodings.

13. The system of claim 9, wherein the graph encoder is configured to aggregate local context from neighboring nodes into the final node encodings of the graph using a graph neural network.

14. At least one non-transitory storage medium storing instructions that, when executed by at least one processor, cause the at least one processor to:

generate a graph corresponding to a map of a scene by encoding map features and agent features as node encodings of the graph;

determine a policy for application to outgoing edges at nodes of the graph;

sample paths for a target vehicle in the scene according to the policy;

predict a set of trajectories based on the sampled paths traversed by the policy and a sampled latent variable; and operate a vehicle based on the set of trajectories of the target vehicle, wherein to predict the set of trajectories, the at least one processor is further caused to:
- output a context vector for the policy using a multi-head attention layer; and
- combine the context vector with motion encodings and the sampled latent variable to predict the set of trajectories.

15. The at least one non-transitory storage medium of claim 14, wherein a respective node corresponds to a segment of a lane centerline of the map.

16. The at least one non-transitory storage medium of claim 14, comprising updating the node encodings with surrounding agent encodings by calculating scaled dot product attention weights.

17. The at least one non-transitory storage medium of claim 14, comprising aggregating local context from neighboring nodes into the node encodings of the graph using a graph neural network.

18. The at least one non-transitory storage medium of claim 14, wherein the policy for application to the outgoing edges is a discrete probability distribution over the outgoing edges at nodes of the graph.

19. The at least one non-transitory storage medium of claim 14, wherein the policy is predicted by training a multilayer perceptron (MLP) using behavior cloning.

* * * * *